(12) United States Patent
Kikumoto et al.

(10) Patent No.: US 11,175,866 B2
(45) Date of Patent: Nov. 16, 2021

(54) INFORMATION PROCESSING SYSTEM AND NON-TRANSITORY COMPUTER READABLE MEDIUM FOR DYNAMICALLY ESTIMATING PRINT TIME FOR PRINT JOBS ON A ROLL OF PAPER

(71) Applicant: FUJIFILM BUSINESS INNOVATION CORP., Tokyo (JP)

(72) Inventors: Takashi Kikumoto, Kanagawa (JP); Shingo Tajima, Kanagawa (JP); Bo Liu, Kanagawa (JP); Masatake Kawabe, Kanagawa (JP); Daisuke Noguchi, Kanagawa (JP); Megumi Yamaguchi, Kanagawa (JP); Shogo Ishikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/787,489

(22) Filed: Feb. 11, 2020

(65) Prior Publication Data
US 2021/0064305 A1 Mar. 4, 2021

(30) Foreign Application Priority Data
Aug. 27, 2019 (JP) .............................. JP2019-155010

(51) Int. Cl.
*G06F 3/12* (2006.01)

(52) U.S. Cl.
CPC .......... *G06F 3/1215* (2013.01); *G06F 3/1205* (2013.01); *G06F 3/126* (2013.01)

(58) Field of Classification Search
None
See application file for complete search history.

(56) References Cited

U.S. PATENT DOCUMENTS

| | | | | |
|---|---|---|---|---|
| 2012/0218590 | A1* | 8/2012 | Dumitrescu | G06F 3/1275 358/1.15 |
| 2014/0078547 | A1* | 3/2014 | Mikami | G03G 15/502 358/1.15 |
| 2015/0356385 | A1* | 12/2015 | Naka | G06K 15/1823 358/1.15 |
| 2015/0379379 | A1* | 12/2015 | Kubota | G06F 3/12 358/1.15 |
| 2019/0149676 | A1* | 5/2019 | Hori | H04N 1/00665 358/1.18 |
| 2020/0081674 | A1* | 3/2020 | Fukami | G06F 3/1235 |

FOREIGN PATENT DOCUMENTS

| | | |
|---|---|---|
| JP | 2002-182875 A | 6/2002 |
| JP | 2017-177363 A | 10/2017 |

* cited by examiner

*Primary Examiner* — Mohammad H Ghayour
*Assistant Examiner* — Pawan Dhingra
(74) *Attorney, Agent, or Firm* — Oliff PLC

(57) ABSTRACT

An information processing system includes a processor configured to dynamically change an estimation of a time needed to execute each print job in accordance with variations in a combination of print jobs allocated to one roll of rolled paper.

8 Claims, 23 Drawing Sheets

FIG. 5

| JOB NAME | RASTERIZING SPEED | PAPER TRAVEL DISTANCE |
|---|---|---|
| PRINT JOB #1 | 100 m/min | 600 m |
| PRINT JOB #2 | 60 m/min | 240 m |
| PRINT JOB #3 | 150 m/min | 900 m |
| PRINT JOB #4 | 40 m/min | 200 m |

FIG. 10

| JOB NAME | RASTERIZING SPEED | PAPER TRAVEL DISTANCE | PRINT SPEED | JOB EXECUTION TIME | |
|---|---|---|---|---|---|
| PRINT JOB #1 | 100 m/min | 600 m | 60 m/min | 00:10:00 | ⎫ ROLLED PAPER #1 |
| PRINT JOB #2 | 60 m/min | 240 m | 60 m/min | 00:04:00 | |
| PRINT JOB #3 | 150 m/min | 900 m | 60 m/min | 00:15:00 | ⎭ |
| PRINT JOB #4 | 40 m/min | 200 m | 40 m/min | 00:05:00 | } ROLLED PAPER #2 |

FIG. 11

| JOB NAME | RASTERIZING SPEED | PAPER ATTRIBUTE | PAPER TRAVEL DISTANCE | PRINT SPEED | JOB EXECUTION TIME | |
|---|---|---|---|---|---|---|
| PRINT JOB #1 | 100 m/min | COATED PAPER | 600 m | 60 m/min | 00:10:00 | ROLLED PAPER #1 |
| PRINT JOB #2 | 60 m/min | COATED PAPER | 240 m | 60 m/min | 00:04:00 | |
| PRINT JOB #3 | 150 m/min | UNCOATED PAPER | 900 m | 80 m/min | 00:10:13 | ROLLED PAPER #2 |
| PRINT JOB #4 | 40 m/min | COATED PAPER | 200 m | 40 m/min | 00:05:00 | ROLLED PAPER #3 |

FIG. 14

| JOB NAME | PAPER ATTRIBUTE | RASTERIZING SPEED | PAPER TRAVEL DISTANCE |
|---|---|---|---|
| PRINT JOB #11 | UNCOATED PAPER | 100 m/min | 6000 m |
| PRINT JOB #12 | UNCOATED PAPER | 50 m/min | 2000 m |
| PRINT JOB #13 | UNCOATED PAPER | 80 m/min | 1500 m |
| PRINT JOB #14 | UNCOATED PAPER | 150 m/min | 4000 m |
| PRINT JOB #15 | COATED PAPER | 40 m/min | 3000 m |
| PRINT JOB #16 | COATED PAPER | 60 m/min | 2000 m |

INDICATION OF SCHEDULES
    PRECONDITIONS:    MAXIMUM TRANSPORT SPEED OF IMAGE FORMING APPARATUS: 80 m/min
                               LENGTH OF ONE ROLL OF ROLLED PAPER: 10000 m
                               TIME REQUIRED TO REPLACE ROLLED PAPER: 30 min
                               PRINT START TIME: 9:00

FIG. 16

| JOB NAME | RASTERIZING SPEED | PAPER ATTRIBUTE | PAPER TRAVEL DISTANCE | PRINT SPEED | JOB EXECUTION TIME |
|---|---|---|---|---|---|
| PRINT JOB #11 | 100 m/min | UNCOATED PAPER | 6000 m | 50 m/min | 02:00:00 |
| PRINT JOB #12 | 50 m/min | UNCOATED PAPER | 2000 m | 50 m/min | 00:40:00 |
| PRINT JOB #13 | 80 m/min | UNCOATED PAPER | 1500 m | 50 m/min | 00:30:00 |
| PRINT JOB #14 | 150 m/min | UNCOATED PAPER | 1500 m | 80 m/min | 00:18:45 |
| PRINT JOB #15 | 40 m/min | COATED PAPER | 3000 m | 40 m/min | 01:15:00 |
| PRINT JOB #16 | 60 m/min | COATED PAPER | 2000 m | 40 m/min | 00:50:00 |

Jobs #11–#14: ROLLED PAPER #11; Job #15: ROLLED PAPER #12; Job #16: ROLLED PAPER #13

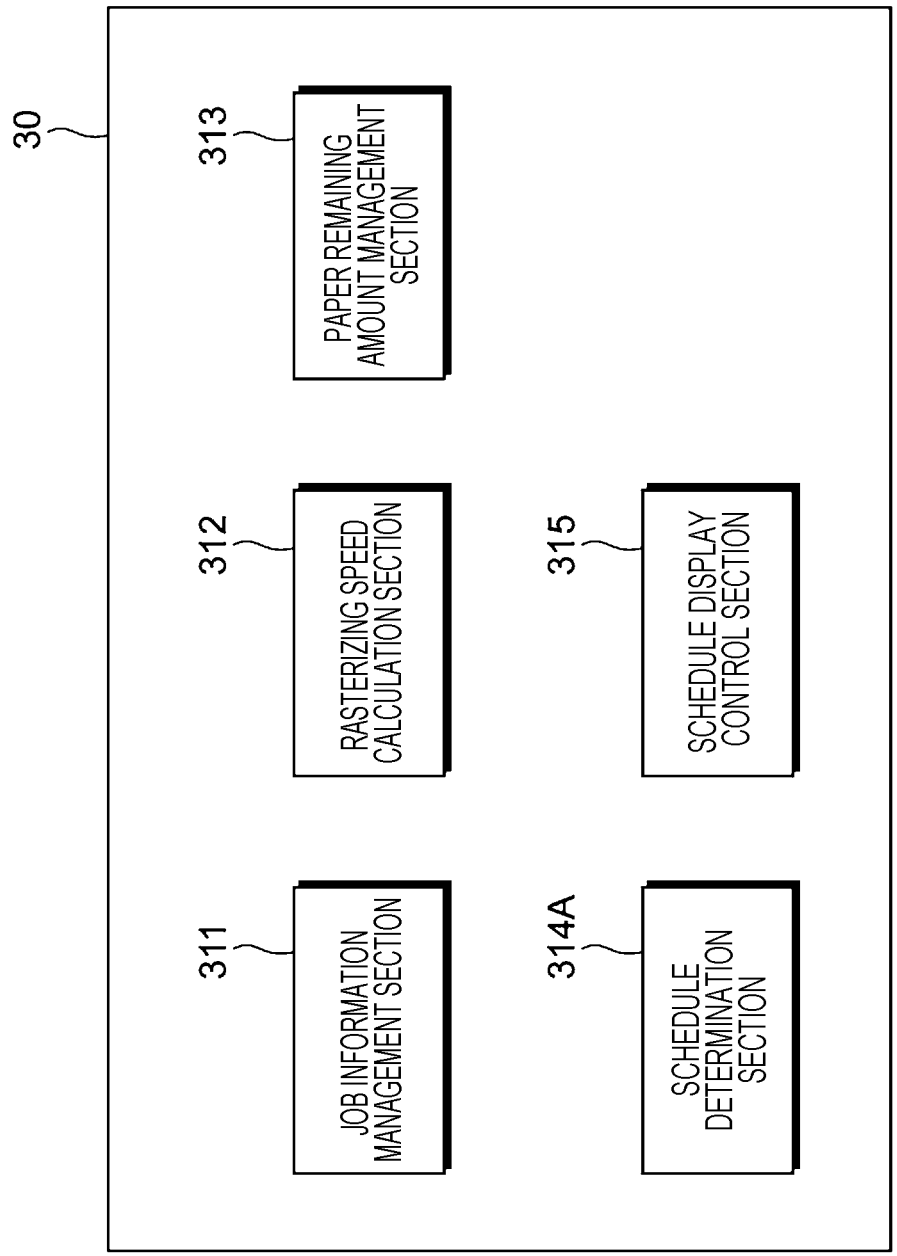

FIG. 19

| JOB NAME | RASTERIZING SPEED | PAPER TRAVEL DISTANCE |
|---|---|---|
| PRINT JOB #21 | 70 m/min | 6000 m |
| PRINT JOB #22 | 50 m/min | 2000 m |
| PRINT JOB #23 | 120 m/min | 1500 m |
| PRINT JOB #24 | 80 m/min | 2000 m |
| PRINT JOB #25 | 100 m/min | 5000 m |
| PRINT JOB #26 | 40 m/min | 2000 m |

INDICATION OF SCHEDULES
   PRECONDITIONS:   MAXIMUM TRANSPORT SPEED OF IMAGE FORMING APPARATUS: 80 m/min
                                  LENGTH OF ONE ROLL OF ROLLED PAPER: 10000 m
                                  TIME REQUIRED TO REPLACE ROLLED PAPER: 30 min
                                  PRINT START TIME: 9:00

FIG. 20

| ROLLED PAPER | JOB NAME | RASTERIZING SPEED | PAPER TRAVEL DISTANCE | PRINT SPEED | JOB EXECUTION TIME | TOTAL |
|---|---|---|---|---|---|---|
| #21 | PRINT JOB #21 | 70 m/min | 6000 m | | 02:00:00 | |
| | PRINT JOB #22 | 50 m/min | 2000 m | 50 m/min | 00:40:00 | 03:10:00 |
| | PRINT JOB #23 | 120 m/min | 1500 m | | 00:30:00 | |
| #22 | PRINT JOB #24 | 80 m/min | 2000 m | | 00:50:00 | |
| | PRINT JOB #25 | 100 m/min | 5000 m | 40 m/min | 02:05:00 | 03:45:00 |
| | PRINT JOB #26 | 40 m/min | 2000 m | | 00:50:00 | |

FIG. 21

| ROLLED PAPER | JOB NAME | RASTERIZING SPEED | PAPER TRAVEL DISTANCE | PRINT SPEED | JOB EXECUTION TIME | TOTAL |
|---|---|---|---|---|---|---|
| #21 | PRINT JOB #21 | 70 m/min | 6000 m | | 01:25:43 | |
| | PRINT JOB #24 | 80 m/min | 2000 m | 70 m/min | 00:28:34 | 02:15:43 |
| | PRINT JOB #23 | 120 m/min | 1500 m | | 00:21:26 | |
| #22 | PRINT JOB #25 | 100 m/min | 5000 m | | 02:05:00 | |
| | PRINT JOB #22 | 50 m/min | 2000 m | 40 m/min | 00:50:00 | 03:45:00 |
| | PRINT JOB #26 | 40 m/min | 2000 m | | 00:50:00 | |

FIG. 23

| ROLLED PAPER | JOB NAME | RASTERIZING SPEED | PAPER TRAVEL DISTANCE | PRINT SPEED | JOB EXECUTION TIME | TOTAL |
|---|---|---|---|---|---|---|
| #21 | PRINT JOB #23 | 120 m/min | 1500 m | 80 m/min | 01:18:45 | 01:46:15 |
| | PRINT JOB #25 | 100 m/min | 5000 m | | 01:02:30 | |
| | PRINT JOB #24 | 80 m/min | 2000 m | | 00:25:00 | |
| #22 | PRINT JOB #21 | 70 m/min | 6000 m | 40 m/min | 02:30:00 | 04:10:00 |
| | PRINT JOB #22 | 50 m/min | 2000 m | | 00:50:00 | |
| | PRINT JOB #26 | 40 m/min | 2000 m | | 00:50:00 | | s
INFORMATION PROCESSING SYSTEM AND NON-TRANSITORY COMPUTER READABLE MEDIUM FOR DYNAMICALLY ESTIMATING PRINT TIME FOR PRINT JOBS ON A ROLL OF PAPER

CROSS-REFERENCE TO RELATED APPLICATIONS

This application is based on and claims priority under 35 USC 119 from Japanese Patent Application No. 2019-155010 filed Aug. 27, 2019.

BACKGROUND

(i) Technical Field

The present disclosure relates to an information processing system and a non-transitory computer readable medium.

(ii) Related Art

An image forming apparatus (hereinafter referred to also as a "continuous feed printer") that forms an image on rolled paper keeps a speed (hereinafter referred to as a "transport speed") at which the rolled paper is transported constant in order to suppress degradation in the image quality. The upper limit of the transport speed is determined in accordance with the limit of the transport capability of the continuous feed printer and the speed at which a print job is rasterized.

An example of the related art is Japanese Unexamined Patent Application Publication No. 2017-177363.

SUMMARY

In the continuous feed printer, a plurality of print jobs are allocated to one roll of rolled paper. Also in the case where a plurality of print jobs are to be printed, it is necessary to keep the transport speed constant until all printing is finished. In the case where a plurality of print jobs are allocated, the transport speed differs in accordance with the combination of the plurality of print jobs allocated to one roll of rolled paper. In other words, the time needed to execute each of a plurality of print jobs allocated to one roll of rolled paper is affected by other print jobs combined therewith.

Aspects of non-limiting embodiments of the present disclosure relate to improving the precision in estimating the time needed to execute each print job, in the case where a plurality of print jobs are allocated to one roll of rolled paper, compared to a configuration in which the time need to execute a print job is estimated without reflecting the combination with other print jobs.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a processor configured to dynamically change an estimation of a time needed to execute each print job in accordance with variations in a combination of print jobs allocated to one roll of rolled paper.

BRIEF DESCRIPTION OF THE DRAWINGS

Exemplary embodiments of the present disclosure will be described in detail based on the following figures, wherein:

FIG. 5 illustrates a specific example of four print jobs handled by a processor;

FIG. 10 illustrates a case where the remaining amount of rolled paper #1 is short of the paper travel distance of the fourth print job #4;

FIG. 11 illustrates a case including two changes in the attributes of paper;

FIG. 14 illustrates a specific example of six print jobs handled by a processor;

FIG. 16 illustrates the result of management performed in units of print jobs to be printed on the same roll of rolled paper;

FIG. 17 illustrates an example of the functional configuration of a management server according to a third exemplary embodiment;

FIG. 19 illustrates a specific example of six print jobs handled by a processor;

FIG. 20 illustrates the result of scheduling according to a management method adopted in the second exemplary embodiment discussed earlier;

FIG. 21 illustrates the result of applying the schedule determination method adopted in the third exemplary embodiment;

FIG. 23 illustrates the result of applying the schedule determination method adopted in the fourth exemplary embodiment.

DETAILED DESCRIPTION

Exemplary embodiments of the present disclosure will be described below with reference to the drawings.

First Exemplary Embodiment

<System Configuration>

Figure 1:
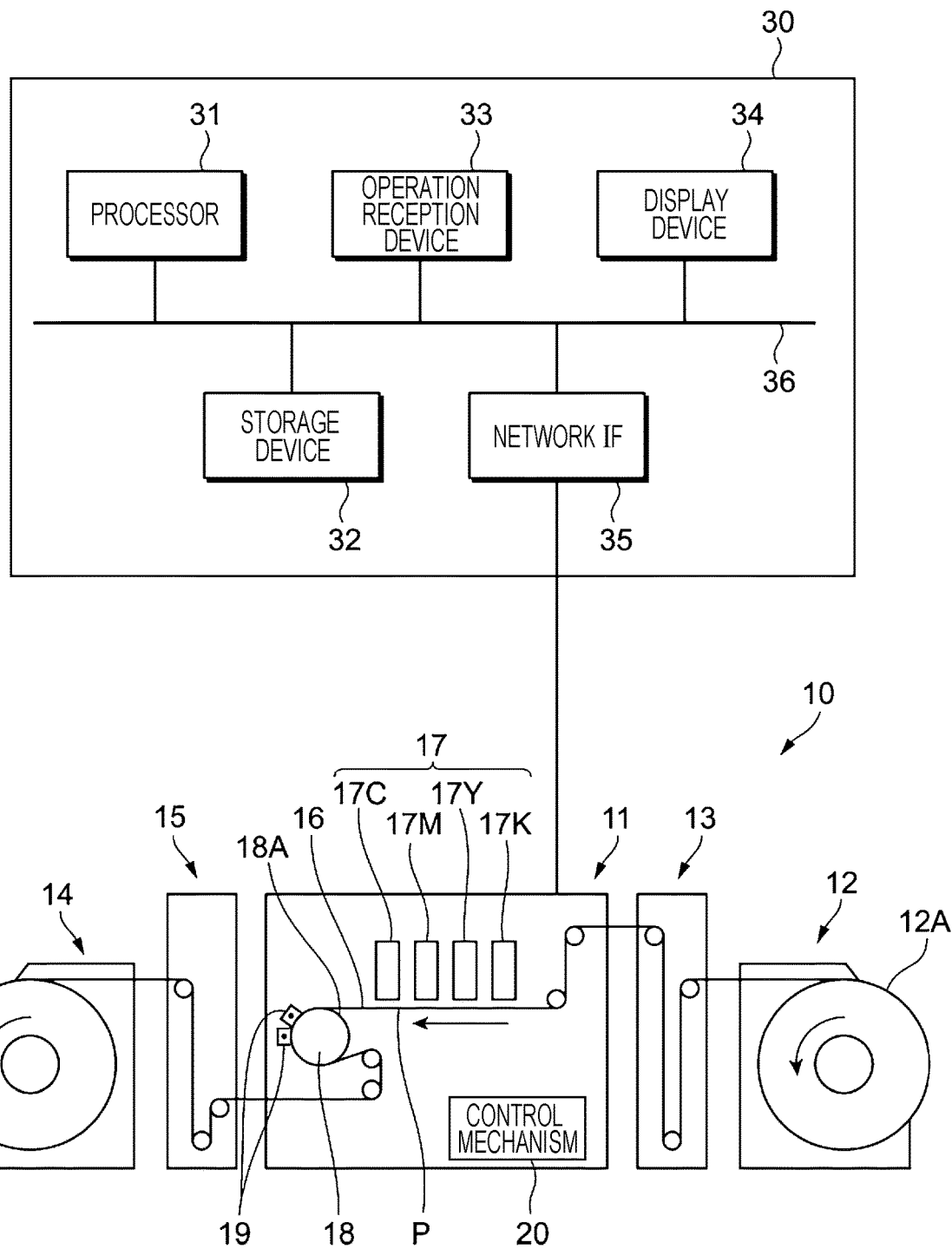
FIG. 1 schematically illustrates an example of the overall configuration of an image forming system according to a first exemplary embodiment.

FIG. 1 schematically illustrates an example of the overall configuration of an image forming system 1 according to a first exemplary embodiment.

The image forming system 1 illustrated in FIG. 1 includes an image forming apparatus 10 that forms an image on rolled paper, and a management server 30 that controls the formation of an image by the image forming apparatus 10. The rolled paper refers to a long length of paper P (hereinafter referred to also as "continuous feed paper P") that is continuous in a band shape and wrapped around a reel. The management server 30 is an example of an information processing system.

<Configuration of Image Forming Apparatus>

The image forming apparatus 10 illustrated in FIG. 1 includes: an image forming unit 11 that forms an image on the continuous feed paper P; a pre-processing unit 12 that houses the continuous feed paper P to be supplied to the image forming unit 11; a buffer unit 13 disposed between the image forming unit 11 and the pre-processing unit 12 to adjust the amount of transport etc. of the continuous feed paper P to be supplied from the pre-processing unit 12 to the image forming unit 11; a post-processing unit 14 that houses the continuous feed paper P ejected from the image forming unit 11; and a buffer unit 15 disposed between the image forming unit 11 and the post-processing unit 14 to adjust the amount of transport etc. of the continuous feed paper P to be ejected from the image forming unit 11 to the post-processing unit 14.

The image forming unit 11 includes a roller member that guides the continuous feed paper P along a transport path 16, and a droplet ejection device 17 that ejects droplets to the continuous feed paper P transported along the transport path 16 to form an image. In this exemplary embodiment, a so-called ink-jet system is adopted as the print method.

The droplet ejection device 17 includes a droplet ejection head 17K that forms a black image by ejecting ink droplets to the continuous feed paper P, a droplet ejection head 17Y that forms a yellow image, a droplet ejection head 17M that forms a magenta image, and a droplet ejection head 17C that forms a cyan image. The droplet ejection head 17K, the droplet ejection head 17Y, the droplet ejection head 17M, and the droplet ejection head 17C are disposed in this order from the upstream side toward the downstream side in the transport direction. As a matter of course, the droplet ejection head 17K, the droplet ejection head 17Y, the droplet ejection head 17M, and the droplet ejection head 17C are disposed to face the continuous feed paper P being transported.

In the following description, symbols K, Y, M, and C that accompany the reference numeral are omitted if no distinction is made among K, Y, M, and C.

A drying drum 18 is disposed downstream of the droplet ejection head 17C in the paper transport direction. The drying drum 18 dries the image formed on the continuous feed paper P while rotating in the following manner in contact with the continuous feed paper P being transported with the back surface of the continuous feed paper P wrapped around an outer peripheral surface 18A of the drying drum 18.

Besides, halogen heaters 19 that dry the image formed on the continuous feed paper P are disposed around the drying drum 18. The halogen heaters 19 dry the image on the continuous feed paper P wrapped around the drying drum 18.

The image forming unit 11 is provided with a control mechanism 20 that controls the various members. The control mechanism 20 includes a central processing unit (CPU), a read only memory (ROM), a random access memory (RAM), and other storage devices such as a hard disk device (none of which are illustrated).

The pre-processing unit 12 includes a supply roller 12A around which the continuous feed paper P to be supplied to the image forming unit 11 is wrapped. The supply roller 12A is rotatably supported by a frame member (not illustrated).

On the other hand, the post-processing unit 14 includes a winding roller 14A as an example of a transport portion that winds the continuous feed paper P on which an image has been formed. The winding roller 14A is rotationally driven by a motor (not illustrated). When the winding roller 14A is rotated, the continuous feed paper P is drawn out from the supply roller 12A, and transported along the transport path 16. The transport speed of the continuous feed paper P is controlled by the control mechanism 20. Specifically, the rotational speed of the motor (not illustrated) which rotationally drives the winding roller 14A is controlled by the control mechanism 20.

In the case of the present exemplary embodiment, control of the transport speed of the continuous feed paper P by the control mechanism 20 is executed on the basis of an instruction from the management server 30. The transport speed of the image forming apparatus 10 is set in units of print jobs scheduled as a single job or consecutive jobs. In the case of the present exemplary embodiment, a single job is constituted as a single print job alone that is separate from other print jobs on the schedule. In other words, a single job refers to a case where only one print job is allocated to one roll of rolled paper. On the other hand, consecutive jobs are constituted from a plurality of print jobs to be printed consecutively at a uniform transport speed on the schedule.

The transport speed of the continuous feed paper P during execution of a single job or consecutive jobs is kept constant. The transport speed during execution of consecutive jobs is determined as the smaller one of the minimum value of the print speed determined in accordance with the rasterizing speed for the print jobs and the maximum value (i.e. the maximum transport speed) of the transport speed as the limit of the performance of the image forming apparatus 10.

<Configuration of Management Server>

The management server 30 includes: a processor 31 that controls operation of the entire server and the image forming apparatus 10 through execution of a program; a storage device 32 that stores the program executed by the processor 31 and various kinds of data; an operation reception device 33 that receives an operation by a user; a display device 34 that displays an operation screen to be seen by the user; and a network interface (IF) 35 that achieves communication with the image forming apparatus 10. These portions are connected to each other by a signal line 36 such as a data bus, an address bus, and a peripheral component interconnect (PCI) bus.

The processor 31 is constituted of a CPU, for example. The storage device 32 is constituted from a ROM that stores a basic input output system (BIOS) etc., a RAM that is used as a work area, and a hard disk device that stores a basic program, an application program, etc., for example. The ROM and the RAM may be included in a part of the processor 31. The processor 31 and the storage device 32 constitute a computer.

The operation reception device 33 is constituted of a keyboard, a mouse, a mechanical button, or a switch, for example. The operation reception device 33 also includes a touch sensor that constitutes a touch screen together with the display device 34.

The display device 34 is constituted of a liquid crystal display or an organic electro-luminescence (EL) display that is used to display information. An operation screen displayed on the display device 34 enables selecting a job to be printed and checking whether the job is being printed or suspended.

<Functional Configuration of Management Server>

Figure 2:
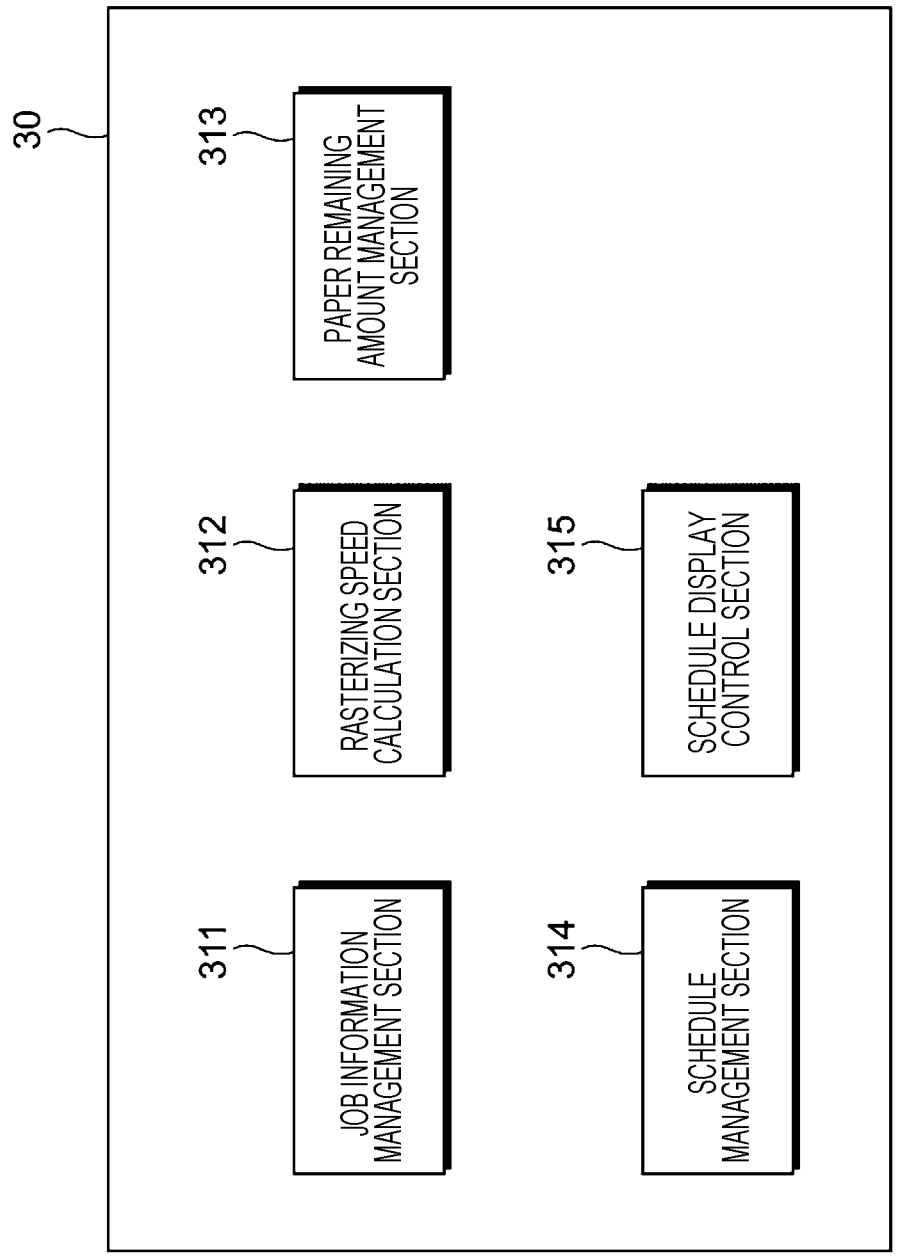
FIG. 2 illustrates an example of the functional configuration of a management server according to the first exemplary embodiment.

FIG. 2 illustrates an example of the functional configuration of the management server 30 according to the first exemplary embodiment.

FIG. 2 illustrates some of the functions implemented by the processor 31 through execution of an application program.

The processor 31 according to the present exemplary embodiment functions as a job information management section 311, a rasterizing speed calculation section 312, a paper remaining amount management section 313, a schedule management section 314, and a schedule display control section 315 through execution of an application program.

The job information management section 311 executes management of the names of print jobs and the contents of the print jobs, management of the continuous feed paper P for use for printing, etc.

The rasterizing speed calculation section 312 calculates the rasterizing speed for each print job on the basis of the content of the print job, the size of document data, the file format of the document data, etc. When the rasterizing speed is calculated, the print speed of the corresponding print job is determined. In the case of consecutive jobs, as discussed earlier, the smallest value of the print speeds corresponding to the print jobs that constitute the consecutive jobs is used to print the consecutive jobs. The print speed of the consecutive jobs is determined so as not to exceed the maximum transport speed that defines the limit of the performance of the image forming apparatus 10 (see FIG. 1).

The paper remaining amount management section 313 executes management of the remaining amount of the continuous feed paper P. The paper remaining amount management section 313 according to the present exemplary embodiment manages the remaining amount of the rolled paper, to which print jobs are to be allocated, on the basis of the paper travel distance determined for each print job.

The schedule management section 314 determines the transport speed or the print speed of the continuous feed paper P for use in a single job or consecutive jobs on the basis of the rasterizing speed for each print job, the maximum transport speed determined in accordance with the performance of the image forming apparatus 10 (see FIG. 1), and the remaining amount of the rolled paper.

The schedule management section 314 according to the present exemplary embodiment calculates the time since the time to start each print job until the time to finish the print job, that is, the job execution time, on the basis of the transport speed or the print speed of the continuous feed paper P which is determined for each single job or each time the combination of print jobs that constitute consecutive jobs is changed.

The schedule display control section 315 displays schedule related to printing of each print job on the display device 34 (see FIG. 1) on the basis of information acquired from the schedule management section 314.

<Schedule Management Process>

Figure 3:
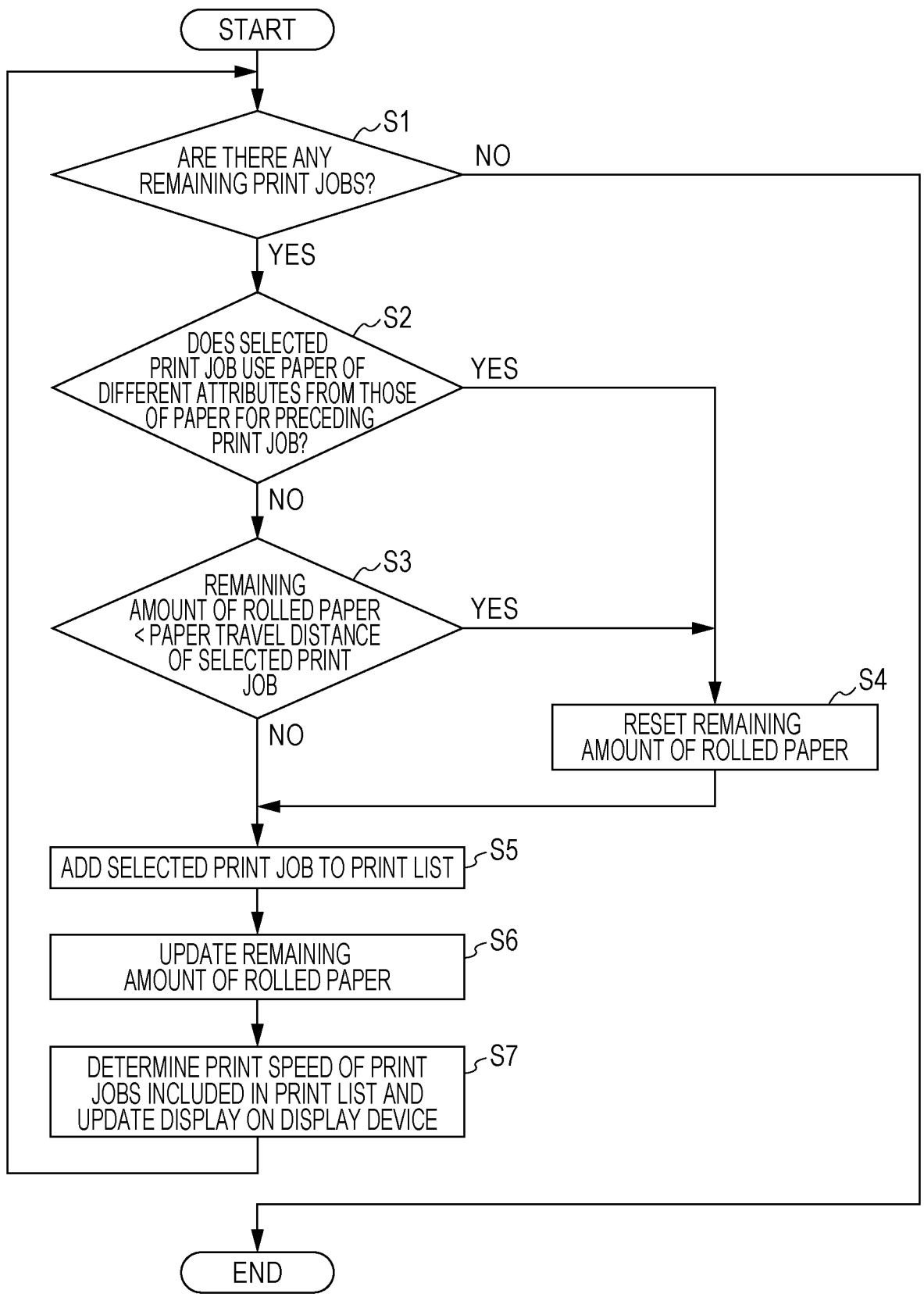
FIG. 3 is a flowchart illustrating an example of schedule management according to the first exemplary embodiment.

FIG. 3 is a flowchart illustrating an example of schedule management according to the first exemplary embodiment.

Symbol S in the drawing denotes "step". The management illustrated in FIG. 3 is executed by the processor 31 (see FIG. 1).

First, the processor 31 determines whether or not there are any remaining print jobs managed by the job information management section 311 (see FIG. 2) (step S1).

In the case where there are no remaining print jobs, the processor 31 obtains a negative result in step S1. In this case, the processor 31 ends the process.

In the case where there are any remaining print jobs, the processor 31 obtains a positive result in step S1. In this case, the processor 31 determines whether or not a selected print job use paper of different attributes from those of paper for the preceding print job (step S2). The attributes of paper include coated paper and uncoated paper, for example.

In the case where paper of different attributes is used, the processor 31 obtains a positive result in step S2. In the case where there is no preceding print job, the processor 31 obtains a positive result in step S2.

In the case where paper of the same attributes is used, the processor 31 obtains a negative result in step S2. In the case where a negative result is obtained in step S2, the processor 31 determines whether or not the remaining amount of the rolled paper is less than the paper travel distance of the selected print job (step S3).

In the case where the remaining amount of the rolled paper is less than the paper travel distance of the print job, the processor 31 obtains a positive result in step S3.

In the case where a positive result is obtained in step S2, or in the case where a positive result is obtained in step S3, the processor 31 resets the remaining amount of the rolled paper (step S4). In either case, a worker who maintains the image forming apparatus 10 removes the rolled paper, which has been mounted, from the image forming apparatus 10, and thereafter attaches a new roll of rolled paper to the image forming apparatus 10. The processor 31 generates a new print list in order to allocate the selected print job to another roll of rolled paper. In the case of the present exemplary embodiment, the print list is managed in units of rolls of rolled paper.

In the case where a negative result is obtained in step S3, or after the execution of step S4, the processor 31 adds the selected print job to the print list (step S5). The print list is correlated with the rolled paper mounted to the image forming apparatus 10.

After that, the processor 31 updates the remaining amount of the rolled paper (step S6).

Next, the processor 31 determines the print speed of the print jobs included in the print list, and updates display on the display device 34 (see FIG. 1) (step S7). After that, the processor 31 returns to step S1.

Figure 4:
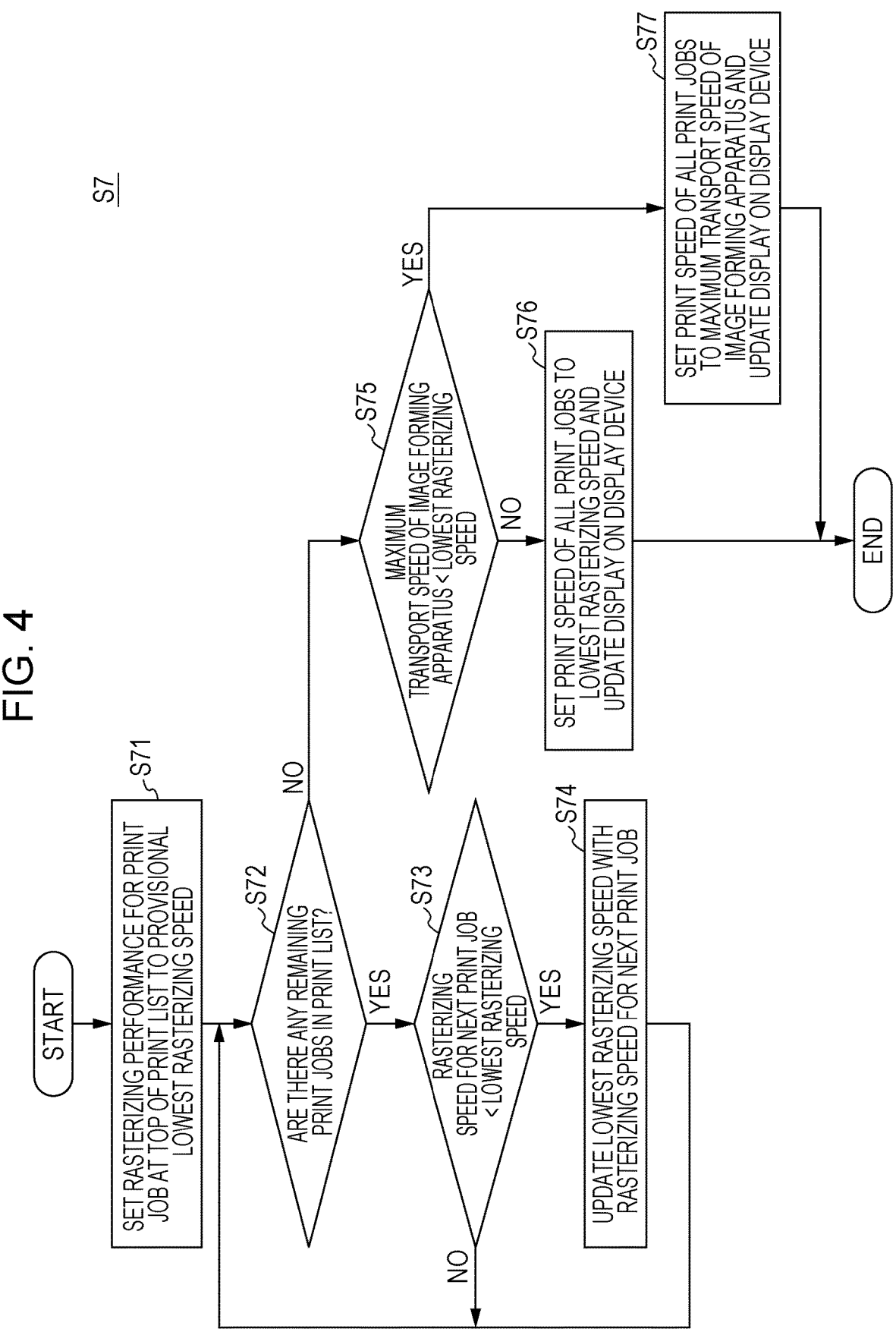
FIG. 4 is a flowchart illustrating the details of processing operation executed in step S7.

FIG. 4 is a flowchart illustrating the details of processing operation executed in step S7. Symbol S in the drawing denotes "step". The management illustrated in FIG. 4 is executed by the processor 31.

First, the processor 31 sets the rasterizing speed for the print job at the top of the print list to a provisional lowest rasterizing speed (step S71).

Next, the processor 31 determines whether or not there are any remaining print jobs in the print list (step S72).

In the case where there are any remaining print jobs in the print list, the processor 31 obtains a positive result in step S72.

In the case where a positive result is obtained in step S72, the processor 31 determines whether or not the rasterizing speed for the next print job is less than the lowest rasterizing speed (step S73).

In the case where the rasterizing speed for the next print job is equal to or more than the lowest rasterizing speed, the processor 31 obtains a negative result in step S73. In this case, the processor 31 returns to step S72.

In the case where the rasterizing speed for the next print job is less than the lowest rasterizing speed, on the contrary, the processor 31 obtains a positive result in step S73. In this case, the processor 31 updates the lowest rasterizing speed with the rasterizing speed for the next print job (step S74).

After the update in step S74, the processor 31 returns to step S72.

In the case where a negative result is obtained in step S72 (i.e. in the case where there is no next print job), on the other hand, the processor 31 determines whether or not the maximum transport speed of the image forming apparatus (see FIG. 1) is less than the lowest rasterizing speed (step S75).

In the case where the maximum transport speed of the image forming apparatus 10 is equal to or more than the lowest rasterizing speed, the processor 31 obtains a negative result in step S75. In this case, the processor 31 sets the print speed of all the print jobs to the lowest rasterizing speed, and updates display on the display device (step S76). The phrase "all the print jobs" means all the print jobs included in the print list.

In the case where the maximum transport speed of the image forming apparatus 10 is less than the lowest rasterizing speed, the processor 31 obtains a positive result in step S75. In this case, the processor 31 sets the print speed of all the print jobs to the maximum transport speed of the image forming apparatus 10, and updates display on the display device 34 (step S77). This is because the continuous feed paper P may not be transported at a speed exceeding the limit of the performance of the image forming apparatus 10.

The update of display on the display device 34 in steps S76 and S77 is an update of schedule related to the printing of one or a plurality of print jobs allocated to one roll of rolled paper, and includes at least an estimation of the time needed to execute each print job.

When step S76 or S77 is ended, the processor 31 returns to step S1 (see FIG. 3).

Specific Example 1

Changes in display that accompany the execution of the processing operation illustrated in FIGS. 3 and 4 will be described below.

FIG. 5 illustrates a specific example of four print jobs handled by the processor 31 (see FIG. 1). The four print jobs are given job names "print job #1" to "print job #4".

The print job #1 may be rasterized at a speed of 100 meters/minute. The length (hereinafter referred to also as a "paper travel distance") of paper to be consumed through execution of the print job #1 is 600 meters.

The print job #2 may be rasterized at a speed of 60 meters/minute. The length of paper to be consumed through execution of the print job #2 is 240 meters.

The print job #3 may be rasterized at a speed of 150 meters/minute. The length of paper to be consumed through execution of the print job #3 is 900 meters.

The print job #4 may be rasterized at a speed of 40 meters/minute. The length of paper to be consumed through execution of the print job #4 is 200 meters.

Figure 6:
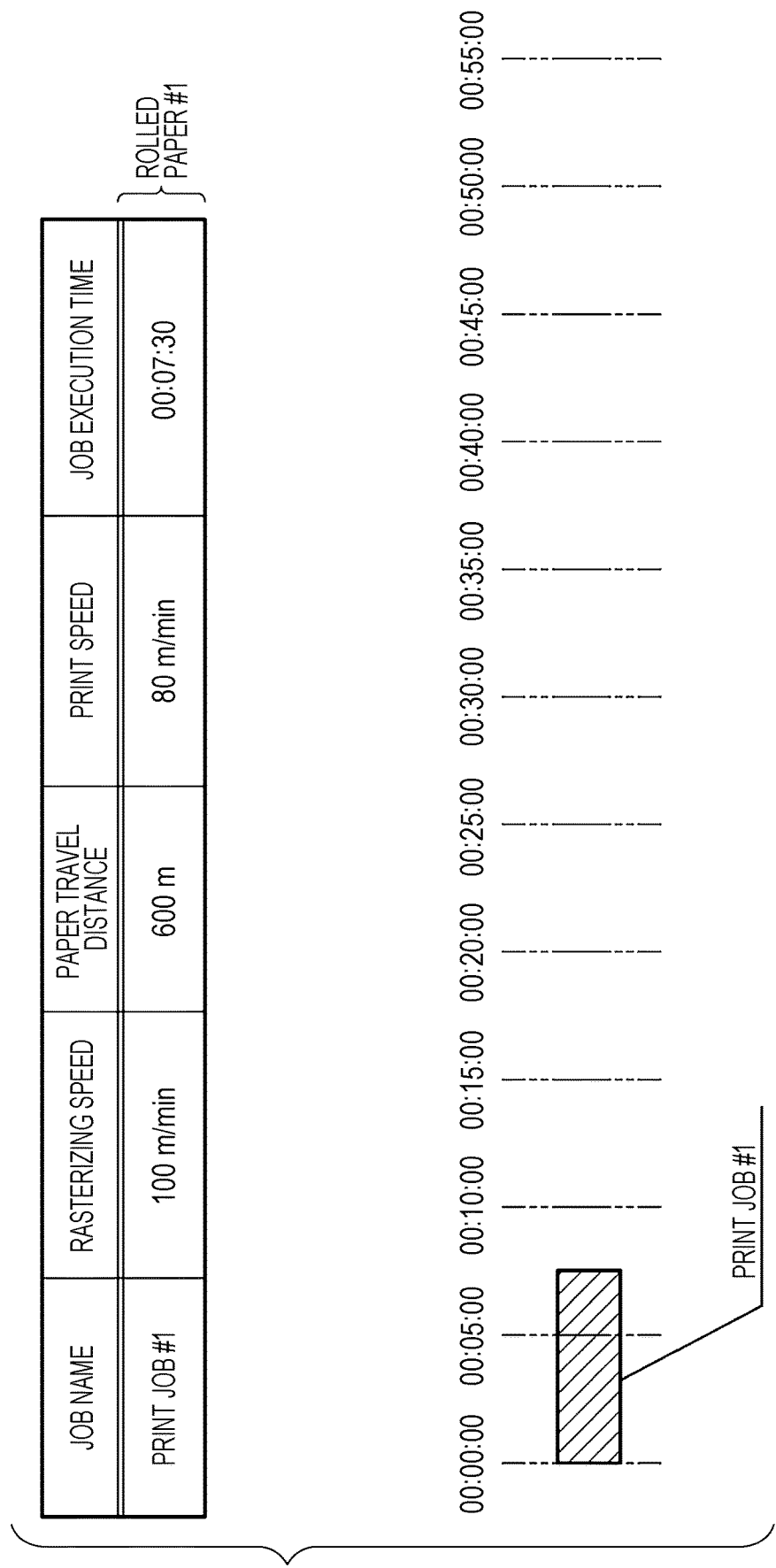
FIG. 6 illustrates a state in which a first print job #1 has been read out.

FIG. 6 illustrates a state in which the first print job #1 has been read out from the list managed by the job information management section 311. The maximum transport speed of the image forming apparatus 10 (see FIG. 1) is determined as 80 meters/minute. In FIG. 6, the print start time is represented as 0 o'clock sharp (=00:00:00).

In the case of FIG. 6, the rasterizing speed for the print job #1 is 100 meters/minute, which is higher than the maximum transport speed of the image forming apparatus 10. Therefore, the print speed at the time when the print job #1 has been read out is set to 80 meters/minute. The display device 34 (see FIG. 1) displays an indication that 7 minutes and 30 seconds is needed to print the print job #1 for 600 meters at a speed of 80 meters/minute. The print job #1 is allocated to rolled paper #1.

Figure 7:
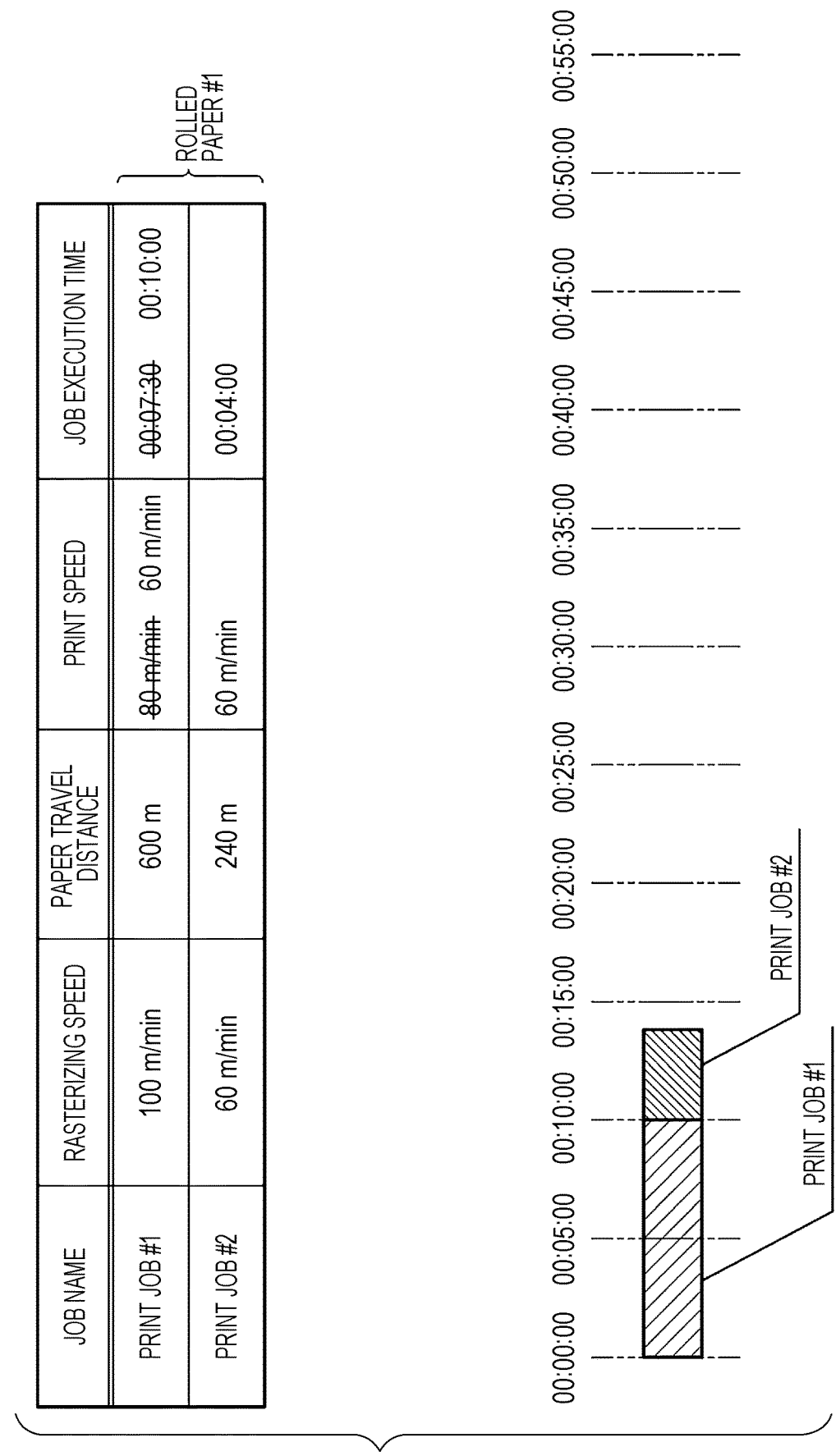
FIG. 7 illustrates a state in which a second print job #2 has been read out.

FIG. 7 illustrates a state in which the second print job #2 has been read out from the list managed by the job information management section 311. The rasterizing speed for the second print job #2 is 60 meters/minute, which is lower than the print speed of 80 meters/minute which is used to print the first print job. Therefore, the lowest rasterizing speed is updated to 60 meters/minute. Therefore, the print speed at the time when the print job #2 has been read out is updated to 60 meters/minute, including the print speed of the print job #1. Accordingly, the job execution time of the print job #1 with a paper travel distance of 600 meters is updated from 7 minutes and 30 seconds to 10 minutes.

Since the paper travel distance of the print job #2 is 240 meters, the job execution time of the print job #2 is 4 minutes.

Figure 8:
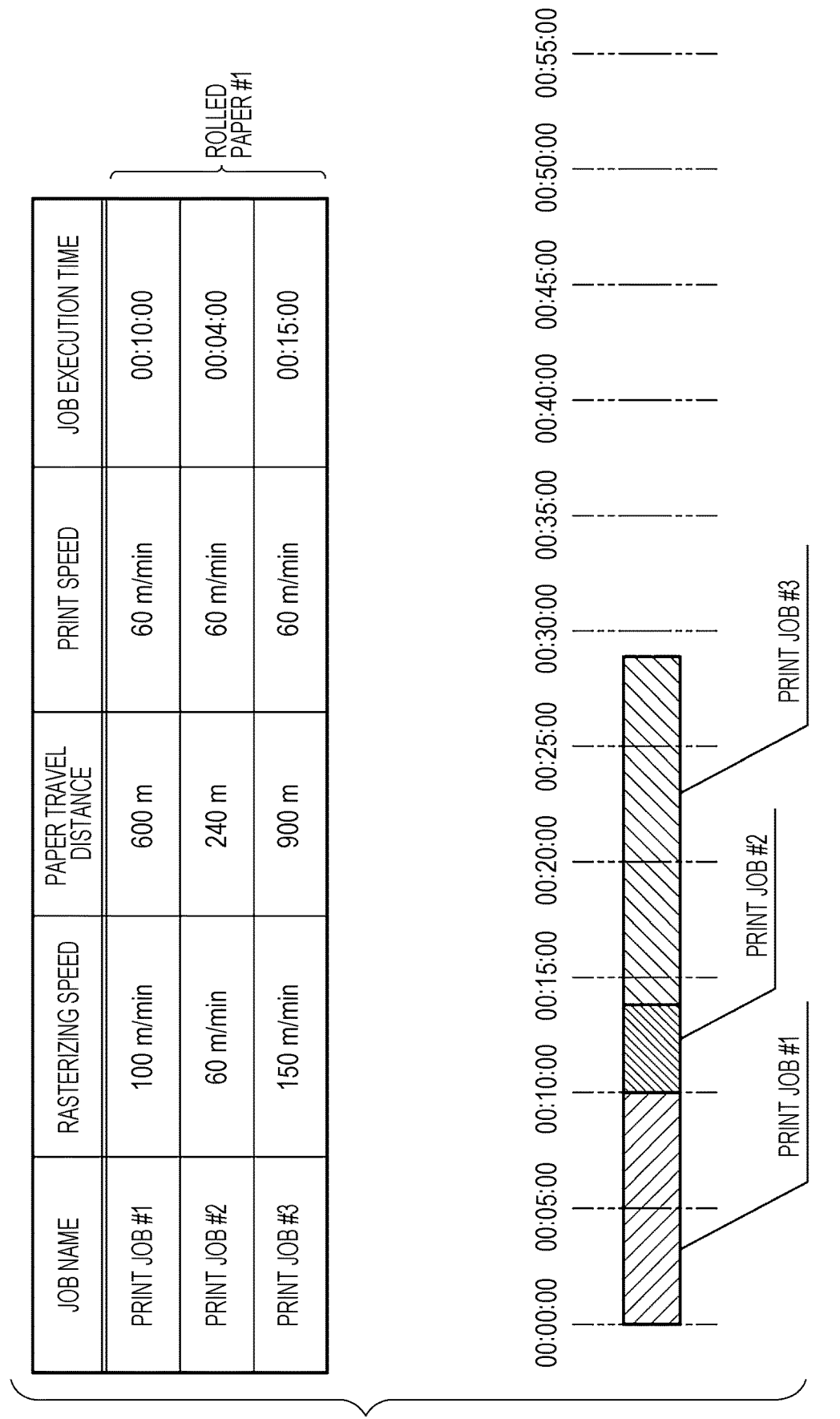
FIG. 8 illustrates a state in which a third print job #3 has been read out.

FIG. 8 illustrates a state in which the third print job #3 has been read out. The rasterizing speed for the third print job #3 is 150 meters/minute, which is higher than the current rasterizing speed. Therefore, the lowest rasterizing speed remains 60 meters/minute. Therefore, no change is made to the display of the job execution times corresponding to the print jobs #1 and #2.

Since the paper travel distance of the print job #3 is 900 meters, the job execution time of the print job #3 is 15 minutes.

Figure 9:
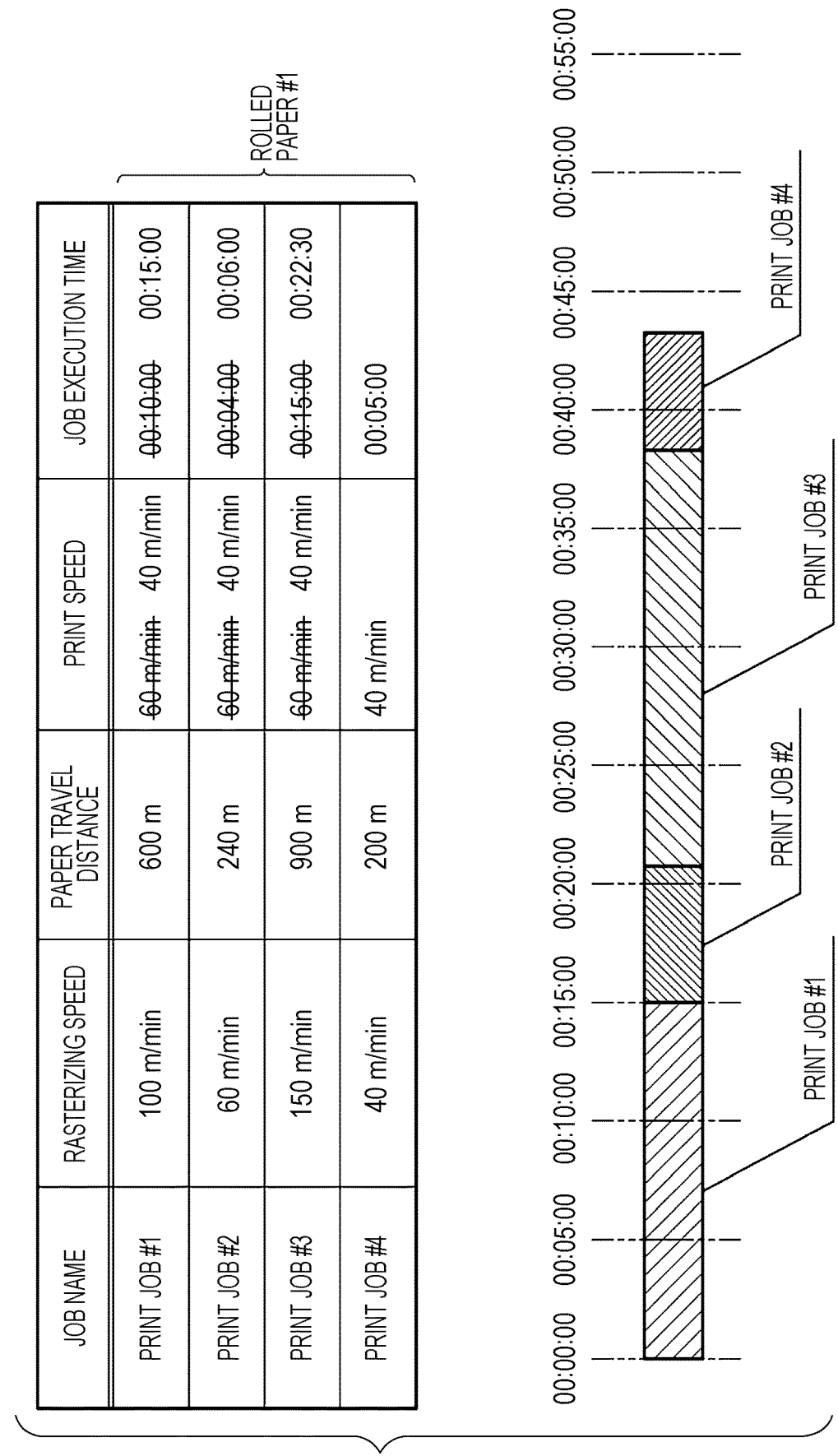
FIG. 9 illustrates a state in which a fourth print job #4 has been read out.

FIG. 9 illustrates a state in which the fourth print job #4 has been read out. The rasterizing speed for the fourth print job #4 is 40 meters/minute, which is lower than the current rasterizing speed for 60 meters/minute. Therefore, the lowest rasterizing speed is updated to 40 meters/minute.

Since the lowest rasterizing speed is updated, the print speed of the print jobs #1 to #3, which have already been read out, is also updated to 40 meters/minute. When the print speed is updated, the job execution time corresponding to each print job is also updated.

For example, the job execution time of the print job #1 is updated from 10 minutes to 15 minutes. The job execution time of the print job #2 is updated from 4 minutes to 6 minutes. The job execution time of the print job #3 is updated from 15 minutes to 22 minutes and 30 seconds.

Since the paper travel distance of the print job #4 is 200 meters, the job execution time of the print job #4 is 5 minutes.

Specific Example 2

In the case of Specific Example 1, the remaining amount of the rolled paper #1 mounted to the image forming apparatus 10 is longer than the total sum of the paper travel distances of the four print jobs #1 to #4.

However, the remaining amount of the rolled paper #1 may be short of the paper travel distance of a newly added print job. This case corresponds to a case where a positive result is obtained in step S3 (see FIG. 3).

FIG. 10 illustrates a case where the remaining amount of rolled paper #1 is short of the paper travel distance of the fourth print job #4.

In the case where the remaining amount of the rolled paper #1 at the time when the print jobs #1 to #3 are added to the print list is less than 200 meters, the print job #4 may not be executed using the rolled paper mounted.

Therefore, the print job #4 is allocated to a roll of rolled paper #2 that is different from that for the print jobs #1 to #3.

Estimations of the print speed and the job execution time of the print jobs #1 to #3 remain the same as those in the display example in FIG. 8.

Specific Example 3

While Specific Examples 1 and 2 assume a case where the attributes of paper are the same, there may be a case where the attributes of paper for use in a print job which has been read out are different from the attributes of paper for use in the preceding print job. This case corresponds to a case where a positive result is obtained in step S2 (see FIG. 3).

FIG. 11 illustrates a case including two changes in the attributes of paper. In the case of FIG. 11, the print speed and the job execution time are estimated for the print jobs #1 and #2 in which printing is performed on coated paper, the print speed and the job execution time are estimated for the print job #3 in which printing is performed on uncoated paper, and the print speed and the job execution time are estimated for the print job #4 in which printing is performed on coated paper.

In this case, the print speed of the print jobs #1 and #2 allocated to the rolled paper #1 is determined as the print speed of the print job #2. Therefore, the contents of the estimations are the same as those in FIG. 7.

The print speed of the print job #3 allocated to the rolled paper #2 is set to 80 meters/minute which is the maximum transport speed of the image forming apparatus 10 (see FIG. 1). Therefore, unlike the example in FIG. 8, the job execution time is 10 minutes and 13 seconds.

The print speed of the print job #4 allocated to rolled paper #3 is determined in accordance with the rasterizing speed, and set to 40 meters/minute. The paper travel distance of the print job #4 is 200 meters. Therefore, the job execution time of the print job #4 is 5 minutes.

Second Exemplary Embodiment

Subsequently, a second exemplary embodiment will be described. The configuration of the image forming system 1 (see FIG. 1) for use in the present exemplary embodiment is also the same as that according to the first exemplary embodiment. In the case of the second exemplary embodiment, however, the display of information on all the print jobs included in a print list correlated with rolled paper is collectively updated at the timing when the rolled paper to which the print jobs are allocated is replaced. In the present exemplary embodiment, a print list managed for each roll of rolled paper is referred to as an "undetermined-speed list".

Figure 12:
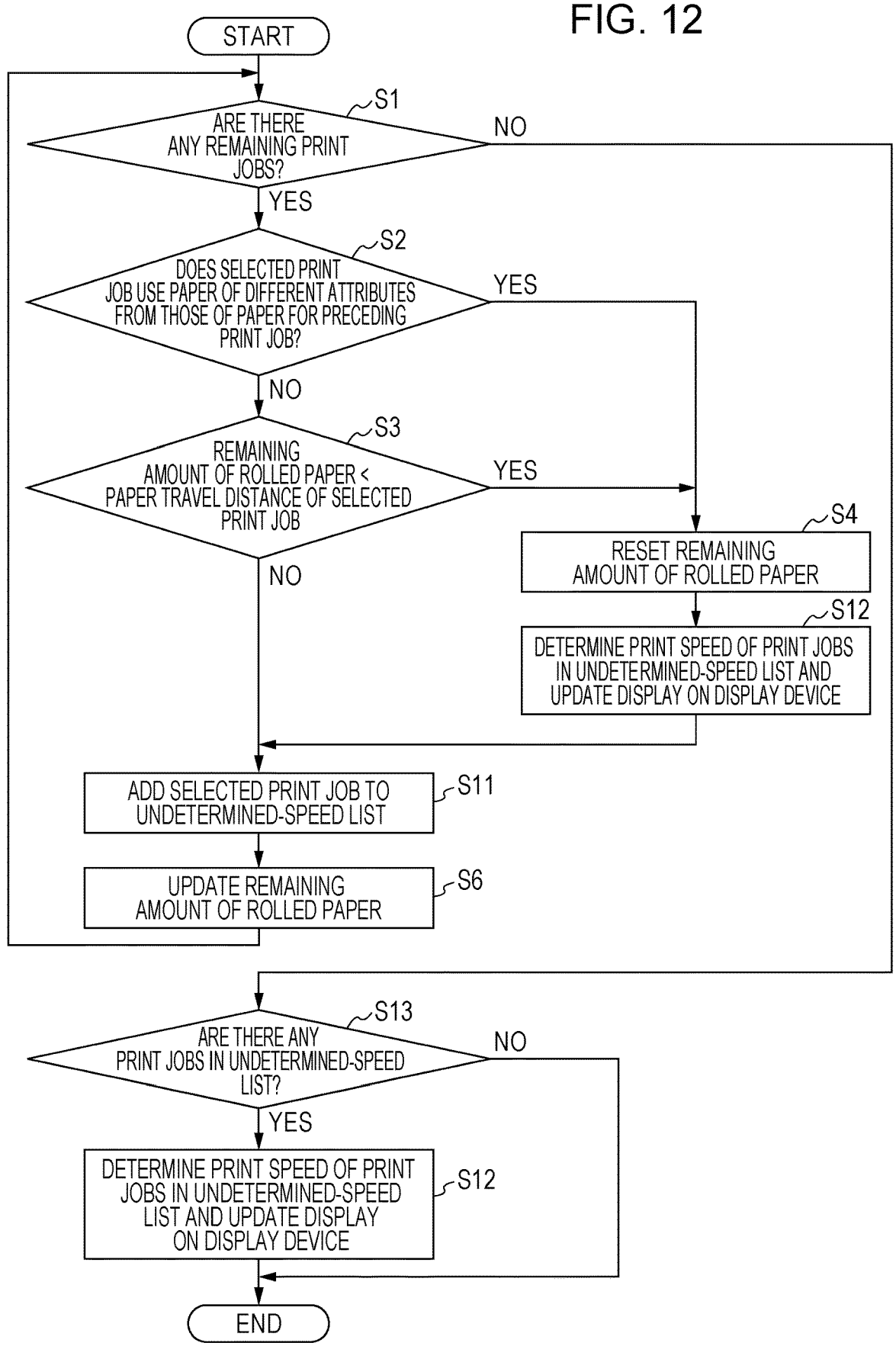
FIG. 12 is a flowchart illustrating an example of schedule management according to the second exemplary embodiment.

FIG. 12 is a flowchart illustrating an example of schedule management according to the second exemplary embodiment. Symbol S in the drawing denotes "step". Portions in FIG. 12 corresponding to those in FIG. 3 are denoted by the corresponding reference numerals.

Also in the case of the present exemplary embodiment, the processing operation in steps S1 to S4 is the same as that according to the first exemplary embodiment illustrated in FIG. 3.

In the case where a negative result is obtained in step S3, however, the processor 31 (see FIG. 1) according to the present exemplary embodiment adds the selected print job to the undetermined-speed list (step S11). When a new print job is added to the undetermined-speed list, the processor 31 updates the remaining amount of the rolled paper (step S6), and thereafter returns to step S1.

After the execution of step S4 which is executed in the case where a positive result is obtained in step S2 or S3, the processor 31 determines the print speed of the print jobs included in the undetermined-speed list, and updates display on the display device 34 (see FIG. 1) (step S12). This is because step S4 is executed on the premise that the rolled paper is replaced and the combination of print jobs included in the undetermined-speed list is determined.

The processor 31 generates a new undetermined-speed list in order to allocate the current print job to another roll of rolled paper. In step S11 which is executed after the execution of step S12, the current print job is added to the newly generated undetermined-speed list.

In the case of the present exemplary embodiment, if a negative result is obtained in step S1, the processor 31 determines whether or not there are any print jobs in the undetermined-speed list (step S13).

In the case where there are no remaining print jobs in the undetermined-speed list, the processor 31 obtains a negative result in step S13, and ends the sequence of processes.

In the case where there are any print jobs in the undetermined-speed list, on the contrary, the processor 31 determines the print speed of the print jobs in the undetermined-speed list, updates the display on the display device 34 (step S12), and thereafter ends the sequence of processes.

Figure 13:
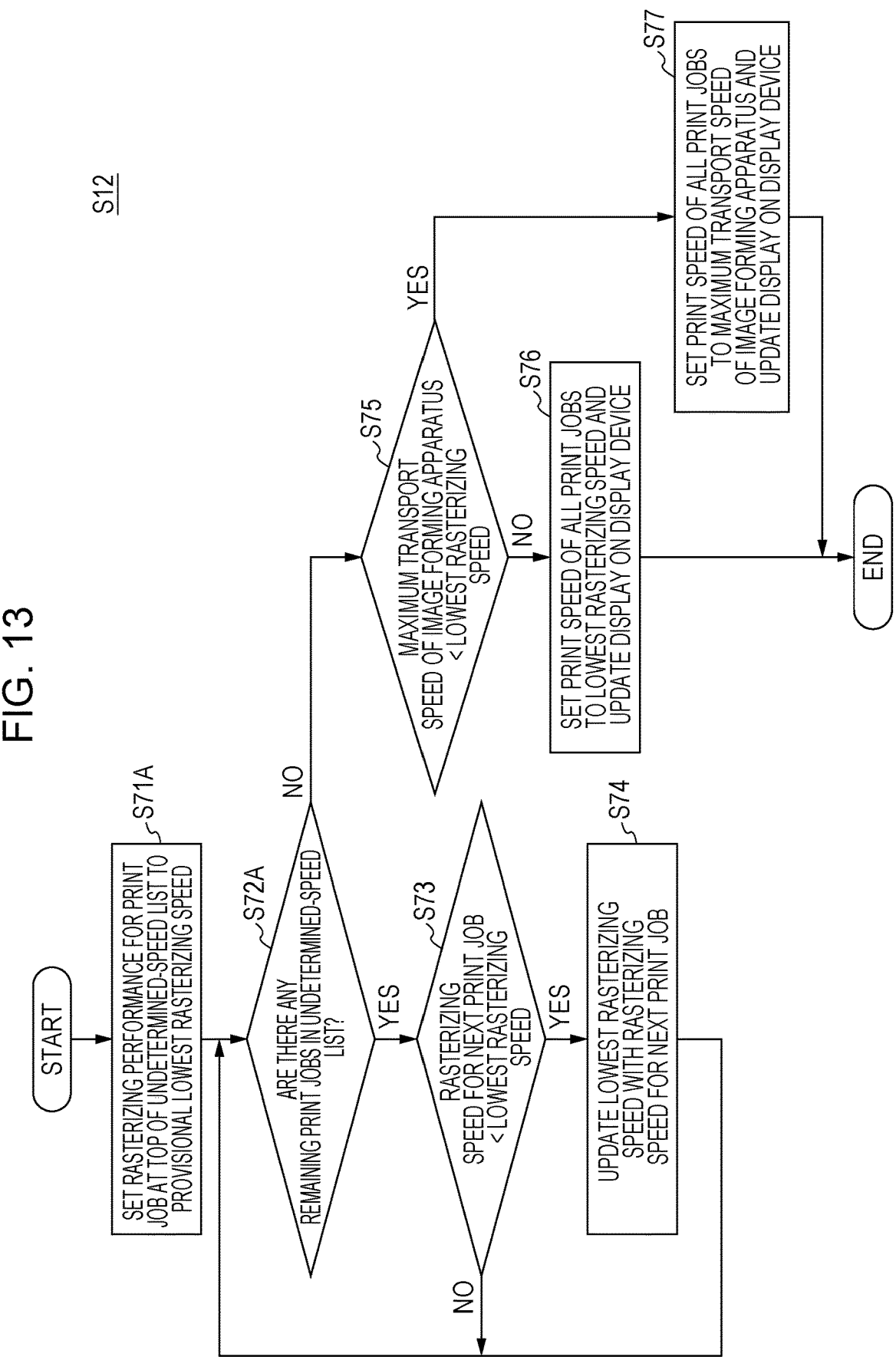
FIG. 13 is a flowchart illustrating the details of processing operation executed in step S12.

FIG. 13 is a flowchart illustrating the details of processing operation executed in step S12. Portions in FIG. 13 corresponding to those in FIG. 4 are denoted by the corresponding reference numerals. Symbol S in the drawing denotes "step". FIG. 13 is different from FIG. 4 only in that the undetermined-speed list is used in place of the print list.

Therefore, the processor 31 sets the rasterizing speed for the print job at the top of the undetermined-speed list to a provisional lowest rasterizing speed (step S71A).

Next, the processor 31 determines whether or not there are any remaining print jobs in the undetermined-speed list (step S72A).

The other processes are the same as those in FIG. 4. That is, in the case where a negative result is obtained in step 72A, the processor 31 executes step S75. In the case where a positive result is obtained in step 73, meanwhile, the processor 31 executes step S74.

Specific Example

Changes in display that accompany the execution of the processing operation illustrated in FIGS. 12 and 13 will be described below.

FIG. 14 illustrates a specific example of six print jobs handled by the processor 31 (see FIG. 1). The six print jobs are given job names "print job #11" to "print job #16".

The print job #11 may be rasterized at a speed of 100 meters/minute. The length (hereinafter referred to also as a "paper travel distance") of paper to be consumed through execution of the print job #11 is 6000 meters. Uncoated paper is designated as the attributes (paper attributes) of paper for the print job #11.

The print job #12 may be rasterized at a speed of 50 meters/minute. The length of paper to be consumed through execution of the print job #12 is 2000 meters. Uncoated paper is designated as the paper attributes also for the print job #12.

The print job #13 may be rasterized at a speed of 80 meters/minute. The length of paper to be consumed through execution of the print job #13 is 1500 meters. Uncoated paper is designated as the paper attributes also for the print job #13.

The print job #14 may be rasterized at a speed of 150 meters/minute. The length of paper to be consumed through execution of the print job #14 is 4000 meters. Uncoated paper is designated as the paper attributes also for the print job #14.

The print job #15 may be rasterized at a speed of 40 meters/minute. The length of paper to be consumed through execution of the print job #15 is 3000 meters. Coated paper is designated as the paper attributes for the print job #15.

The print job #16 may be rasterized at a speed of 60 meters/minute. The length of paper to be consumed through execution of the print job #16 is 2000 meters. Coated paper is designated as the paper attributes also for the print job #16.

The maximum transport speed of the image forming apparatus 10 (see FIG. 1) for use in the following description is determined as 80 meters/minute.

The length of one roll of rolled paper attached to the image forming apparatus 10 is 10000 meters, and the time needed to replace the roll of rolled paper is determined as 30 minutes. In the following description, the print start time is determined as 9 o'clock sharp (=09:00).

Figure 15:
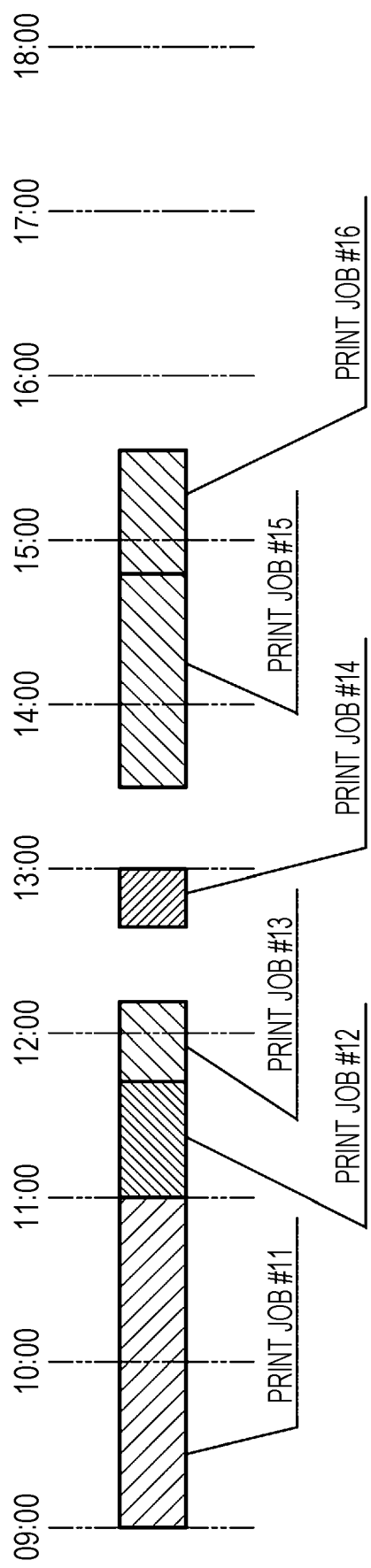
FIG. 15 illustrates the result of scheduling according to a management method adopted in the second exemplary embodiment.

FIG. 15 illustrates the result of scheduling according to a management method adopted in the second exemplary embodiment.

First, uncoated paper is designated as the paper attributes for the print jobs #11 to #14. However, the paper travel distance is 9500 meters at the time when the print jobs #11 to #13 are added to the undetermined-speed list. Therefore, the remaining amount of the rolled paper is 500 meters. On the other hand, the paper travel distance of the print job #14 is 4000 meters, which exceeds the remaining amount of the rolled paper being used. Therefore, the print job #14 is allocated to a different roll of rolled paper from that for the print jobs #11 to #13 to be managed.

Thus, in the case of FIG. 15, a vacant time of 30 minutes is scheduled between the print jobs #11 to #13 and the print job #14.

The rasterizing speed for the print job #12 is the lowest at 50 meters/minute, among those for the print jobs #11 to #13. A speed of 50 meters/minute is lower than the maximum transport speed of the image forming apparatus 10, which is 80 meters/minute. Therefore, the print speed of the print jobs #11 to #13 is determined as 50 meters/minute.

FIG. 16 illustrates the result of management performed in units of print jobs to be printed on the same roll of rolled paper. In FIG. 16, the print speed of the print jobs #11 to #13 is determined as 50 meters/minute, and the total sum of the job execution times is 3 hours and 10 minutes (=03:10:00). Therefore, in the case of FIG. 15, the print end time of the print jobs #11 to #13 is ten minutes past twelve. Since it takes 30 minutes to replace the rolled paper #11, the print start time of the print job #14 in FIG. 15 is twelve forty.

While uncoated paper is designated as printing paper for the print job #14, coated paper is designated as paper for printing for the next print job #15. Therefore, only the print job #14 is allocated to a new roll of rolled paper #12.

The rasterizing speed for the print job #14 is 150 meters/minute. However, a speed of 150 meters/minute is higher than the maximum transport speed of the image forming apparatus 10, which is 80 meters/minute. Therefore, the print speed of the print job #14 is determined as 80 meters/minute. As a result, the job execution time of the print job #14 is 18 minutes and 45 seconds.

In the example in FIG. 15, the start time of the print job #15 is set to half past 1 pm with the addition of 30 minutes which is the time needed to replace the rolled paper.

Coated paper is used as printing paper for both the print jobs #15 to #16. Further, the paper travel distance of the print job #15 is 3000 meters, and the paper travel distance of the print job #16 is 2000 meters. Therefore, the print jobs #15 and #16 may be printed on rolled paper #13. The rasterizing speed for the print job #15 is the lower at 40 meters/minute, of those for the print jobs #15 and #16. A speed of 40 meters/minute is lower than the maximum transport speed of the image forming apparatus 10, which is 80 meters/minute. Therefore, the print speed of the print jobs #15 and #16 is determined as 40 meters/minute. As a result, the total sum of the job execution times of the print jobs #15 and #16 is 2 hours and 5 minutes.

Therefore, in the example in FIG. 15, the end time of the print job #16 is 25 minutes to 3 pm.

Third Exemplary Embodiment

Subsequently, a third exemplary embodiment will be described. The configuration of the image forming system 1 (see FIG. 1) for use in the present exemplary embodiment is also the same as that according to the first exemplary embodiment.

In the first and second exemplary embodiments discussed earlier, rolled paper to which print jobs are to be allocated is managed in the order in which a user designates the print jobs, and the print speed to be applied to the print jobs allocated in units of rolls of rolled paper is determined to estimate the time needed to execute each print job.

In the third exemplary embodiment, however, the combination of print jobs to be allocated to rolls of rolled paper is changed with reference to the paper travel distance.

FIG. 17 illustrates an example of the functional configuration of the management server 30 according to the third exemplary embodiment. Portions in FIG. 17 corresponding to those in FIG. 2 are denoted by the corresponding reference numerals.

In the case of the present exemplary embodiment, a schedule determination section 314A is used in place of the schedule management section 314 (see FIG. 2).

The schedule determination section 314A determines a schedule that improves the efficiency in executing the print jobs on the basis of the rasterizing speed for each print job, the maximum transport speed that defines the limit of the performance of the image forming apparatus 10 (see FIG. 1), and an estimated value of the remaining amount of the rolled paper.

Figure 18:
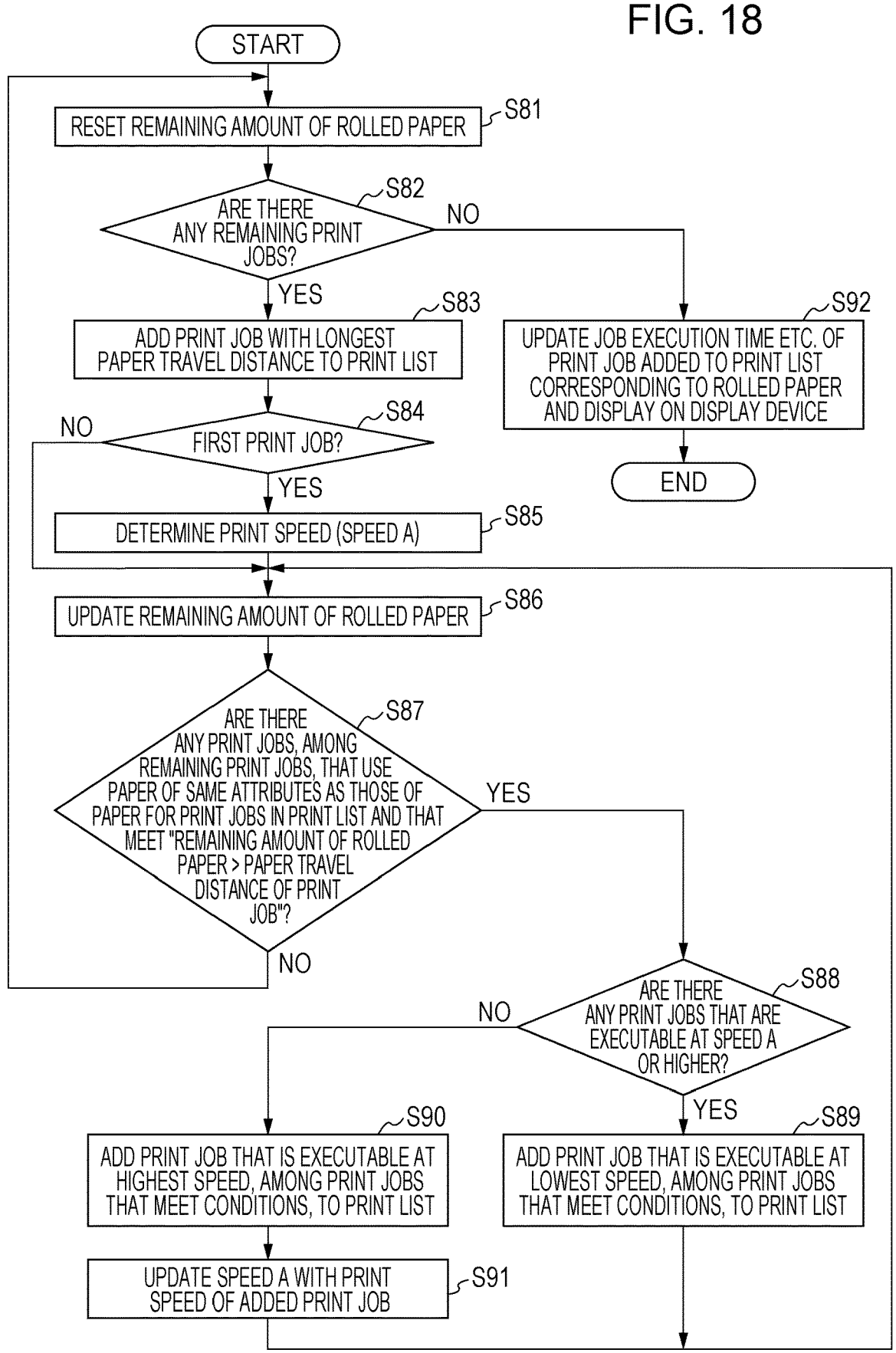
FIG. 18 is a flowchart illustrating an example of a schedule determination method according to the third exemplary embodiment.

FIG. 18 is a flowchart illustrating an example of a schedule determination method according to the third exemplary embodiment. The process illustrated in FIG. 18 is executed by the processor 31 (see FIG. 1).

First, the processor 31 resets the remaining amount of the rolled paper (step S81).

Next, the processor 31 determines whether or not there are any remaining print jobs managed by the job information management section 311 (see FIG. 17) (step S82).

In the case where there are any remaining print jobs, the processor 31 obtains a positive result in step S82. In this case, the processor 31 adds the print job with the longest paper travel distance to the print list (step S83). As discussed earlier, the print jobs are managed in units of rolls of rolled paper.

Next, the processor 31 determines whether or not the added print job is the first print job (step S84).

In the case where the added print job is the first print job, the processor 31 obtains a positive result in step S84. In this case, the processor 31 determines the print speed to be applied to the print jobs in the print list (step S85). Hereinafter, the print speed determined in step S85 is referred to as a "speed A".

In the case where the print job added to the print list is not the first print job, on the other hand, the processor 31 obtains a negative result in step S84. In this case, the processor 31 skips step S85.

In the case where a negative result is obtained in step S84, or after the execution of step S85, the processor 31 updates the remaining amount of the rolled paper (step S86). Specifically, the paper travel distance of the print job added in step S83 is subtracted from the most recent remaining amount of the rolled paper.

Subsequently, the processor 31 determines whether or not there are any print jobs, among the remaining print jobs managed by the job information management section 311, that use paper of the same attributes as those of paper for the print jobs in the print list and that meet "the remaining amount of the rolled paper>the paper travel distance of the print job" (step S87).

In the case where the remaining print jobs managed by the job information management section 311 do not meet the two conditions discussed earlier, the processor 31 obtains a negative result in step S87. In this case, it is meant that there remain no print jobs that may be printed on the same roll of rolled paper. Therefore, the processor 31 returns to step S81.

In the case where the remaining print jobs managed by the job information management section 311 meet the two conditions discussed earlier, on the other hand, the processor 31 obtains a positive result in step S87. In this case, it is meant that there remain print jobs that may be printed on the same roll of rolled paper.

In the case where a positive result is obtained in step S87, the processor 31 determines whether or not there are any print jobs that are executable at the speed A or higher (step S88).

In the case where there are any print jobs that are executable at the speed A or higher, the processor 31 obtains a positive result in step S88. In this case, the processor 31 adds the print job that is executable at the lowest speed, among the print jobs that meet the conditions, to the print list (step S89). The print job added in step S89 is a print job printed at the speed A which is lower than the original print speed, and thus the print job, the difference in the speed of which from the speed A is the smallest, is selected. After the execution of step S89, the processor 31 returns to step S86.

In the case where there are no print jobs that are executable at the speed A or higher, on the contrary, the processor 31 obtains a negative result in step S88. In this case, the processor 31 adds the print job that is executable at the highest speed, among the print jobs that meet the conditions, to the print list (step S90). The print job added to the print list needs to be matched with the print speed of the print job newly added in step S90. Therefore, the print job, the difference in the speed of which from the current speed A is the smallest, is selected.

After that, the processor 31 updates the speed A with the print speed of the added print job (step S91). As discussed earlier, the speed A after the update is lower than that before the update. After the execution of step S91, the processor 31 returns to step S86.

Incidentally, in the case where there are both a print job for which a positive result is obtained in step S88 and a print job for which a negative result is obtained in step S88, the processor 31 according to the present exemplary embodiment prioritizes the print job for which a positive result is obtained. This is for the purpose of maintaining the print speed that is used to print a plurality of print jobs added to the print list being as high as possible.

In the case where there are no remaining print jobs in the determination in step S82, the processor 31 obtains a negative result in step S82. In this case, the processor 31 updates the job execution time etc. of the print job added to the print list corresponding to the rolled paper, and displays the updated information on the display device (step S92). After that, the processor 31 ends the process.

Specific Example

Changes in display that accompany the execution of the processing operation illustrated in FIG. 18 will be described below.

FIG. 19 illustrates a specific example of six print jobs handled by the processor 31 (see FIG. 1). The six print jobs are given job names "print job #21" to "print job #26".

The print job #21 may be rasterized at a speed of 70 meters/minute. The length (hereinafter referred to also as a "paper travel distance") of paper to be consumed through execution of the print job #21 is 6000 meters.

The print job #22 may be rasterized at a speed of 50 meters/minute. The length of paper to be consumed through execution of the print job #22 is 2000 meters.

The print job #23 may be rasterized at a speed of 120 meters/minute. The length of paper to be consumed through execution of the print job #23 is 1500 meters.

The print job #24 may be rasterized at a speed of 80 meters/minute. The length of paper to be consumed through execution of the print job #24 is 2000 meters.

The print job #25 may be rasterized at a speed of 100 meters/minute. The length of paper to be consumed through execution of the print job #25 is 5000 meters.

The print job #26 may be rasterized at a speed of 40 meters/minute. The length of paper to be consumed through execution of the print job #26 is 2000 meters.

The maximum transport speed of the image forming apparatus 10 (see FIG. 1) for use in the following description is determined as 80 meters/minute.

The length of one roll of rolled paper attached to the image forming apparatus 10 is 10000 meters, and the time needed to replace the roll of rolled paper is determined as 30 minutes. In the following description, the print start time is determined as 9 o'clock sharp (=09:00).

FIG. 20 illustrates the result of scheduling according to the management method adopted in the second exemplary embodiment discussed earlier. FIG. 20 is used for comparison with the present exemplary embodiment.

In the case of the second exemplary embodiment, print jobs to be allocated to rolls of rolled paper are determined in the order of registration in the job information management section 311 (see FIG. 2). Therefore, the print jobs #21 to #23, the total sum of the paper travel distances of which is 9500 meters, are allocated to rolled paper #21, and the print jobs #24 to #26, the total sum of the paper travel distances of which is 9000 meters, are allocated to rolled paper #22.

In the case of FIG. 20, the print speed, which is determined from the rasterizing speed, of the print job #22 is the lowest at 50 meters/minute, among those of the print jobs #21 to #23. Meanwhile, the print speed, which is determined from the rasterizing speed, of the print job #26 is the lowest at 40 meters/minute, among those of the print jobs #24 to #26. Therefore, the print speed corresponding to the rolled paper #21 is determined as 50 meters/minute, and the print speed corresponding to the rolled paper #22 is determined as 40 meters/minute.

As a result, it takes 3 hours and 10 minutes to print the print jobs #21 to #23 allocated to the rolled paper #21, and it takes 3 hours and 45 minutes to print the print jobs #24 to #26 allocated to the rolled paper #22.

Therefore, it takes 6 hours and 55 minutes to print the print jobs #21 to #26, excluding the paper replacement time.

FIG. 21 illustrates the result of applying the schedule determination method adopted in the third exemplary embodiment.

In the present exemplary embodiment, as illustrated in FIG. 18, one print job with the longest paper travel distance in a range in which the remaining amount of the rolled paper is not exceeded is selected, and added to the print list corresponding to the rolled paper.

Therefore, the print jobs #21, #24, and #23 are allocated to the rolled paper #21, and the print jobs #25, #22, and #26 are allocated to the rolled paper #22.

For example, in the case of the rolled paper #21, the print speed of the print job #21, the paper travel distance of which is the longest, is the lowest. Therefore, the print speed for the rolled paper #21 is determined as 70 meters/minute. In this case, it takes 2 hours 15 minutes 43 seconds to print the print jobs #21, #24, and #23 allocated to the rolled paper #21.

In the case of the rolled paper #22, on the other hand, the print speed of the print job #25, the paper travel distance of which is the longest, is higher than the print speeds corresponding to the two other print jobs. The print speed of the print job #26 is the lowest at 40 meters/minute. Therefore, the print speed for the rolled paper #22 is determined as 40 meters/minute. In this case, it takes 3 hours and 45 minutes to print the print jobs #25, #22, and #26 allocated to the rolled paper #22.

Therefore, it takes 6 hours 0 minutes 43 seconds to print the print jobs #21 to #26, excluding the paper replacement time.

Fourth Exemplary Embodiment

Subsequently, a fourth exemplary embodiment will be described. The configuration of the image forming system for use in the present exemplary embodiment is also the same as that according to the first exemplary embodiment.

In the exemplary embodiment discussed earlier, print jobs to be allocated to the rolled paper are determined in the descending order of the paper travel distance.

In the fourth exemplary embodiment, print jobs to be allocated to the rolled paper are determined in the descending order of the print speed.

Also in the case of the fourth exemplary embodiment, the management server 30 which has the functional configuration illustrated in FIG. 17 is used.

Figure 22:
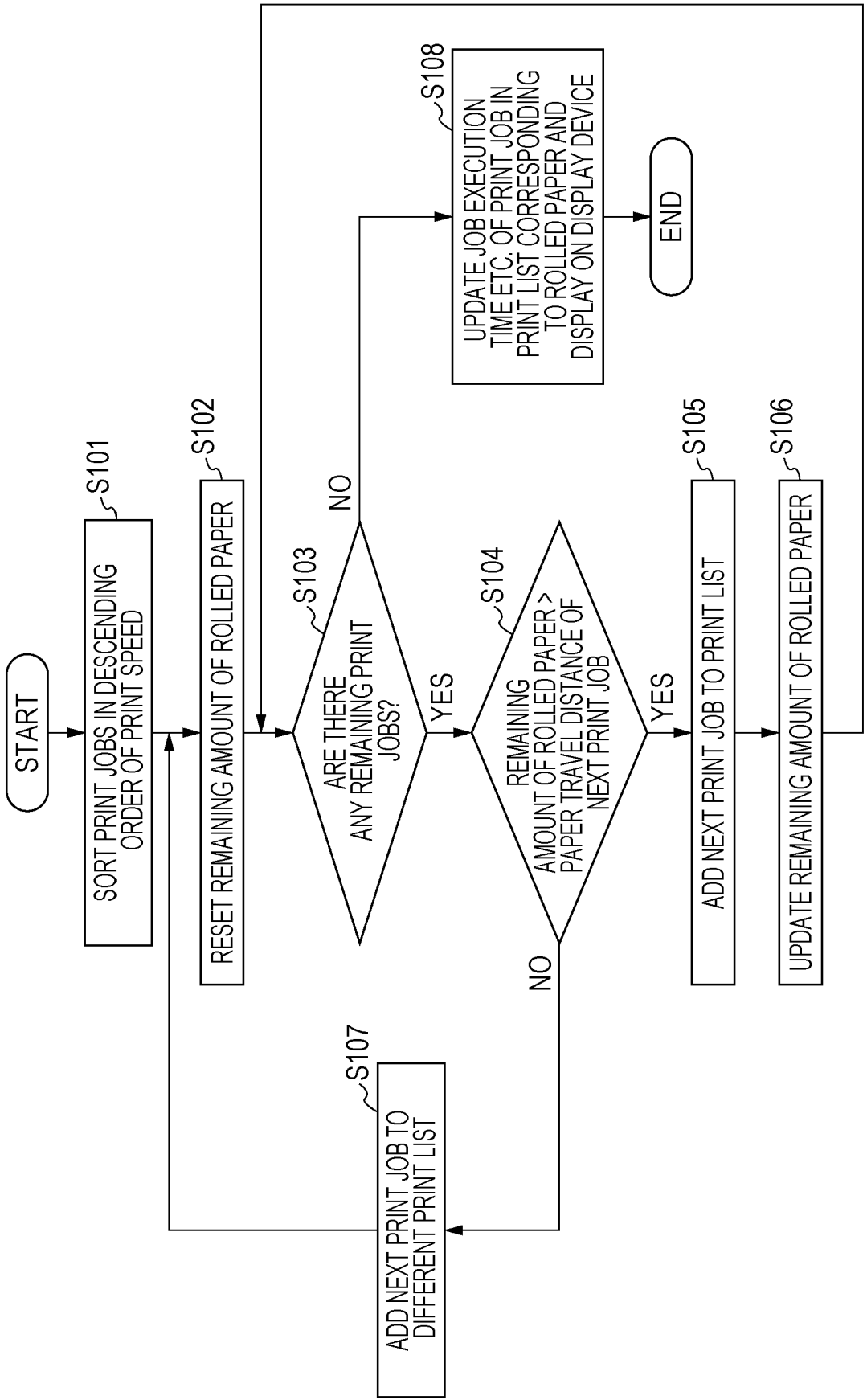
FIG. 22 is a flowchart illustrating an example of a schedule determination method according to a fourth exemplary embodiment.

FIG. 22 is a flowchart illustrating an example of a schedule determination method according to the fourth exemplary embodiment.

First, the processor 31 sorts the print jobs in the descending order of the print speed. The print jobs to be sorted are managed by the job information management section 311 (see FIG. 17).

After that, the processor 31 resets the remaining amount of the rolled paper (step S102).

Next, the processor 31 determines whether or not there are any remaining print jobs (step S103).

In the case where there are any remaining print jobs, the processor 31 obtains a positive result in step S103. In this case, the processor 31 determines whether or not the remaining amount of the rolled paper is more than the paper travel distance of the next print job (step S104). As discussed earlier, the print jobs are managed in units of rolls of rolled paper.

In the case where the paper travel distance of the next print job is shorter than the remaining amount of the rolled paper, the processor 31 obtains a positive result in step S105. In this case, the processor 31 adds the next print job to the print list (step S105).

After that, the processor 31 updates the remaining amount of the rolled paper (step S106), and returns to step S103.

In the case where the paper travel distance of the next print job is longer than the remaining amount of the rolled paper in the determination in step S104, on the other hand, the processor 31 obtains a negative result in step S104. In this case, the processor 31 adds the next print job to another print list (step S107), and thereafter returns to step S102. In this case, the rolled paper is replaced, and thus the remaining amount of the rolled paper is reset.

In the case where there are no remaining print jobs in the determination in step S103, the processor 31 obtains a negative result in step S103. In this case, the processor 31 updates the job execution time etc. of the print job in the print list corresponding to the rolled paper, and displays the updated information on the display device (step S108). After that, the processor 31 ends the sequence of processes.

Specific Example

Changes in display that accompany the execution of the processing operation illustrated in FIG. 22 will be described below.

FIG. 23 illustrates the result of applying the schedule determination method adopted in the fourth exemplary embodiment.

The six print jobs #21 to #26 handled in FIG. 23 are the same as those in the case of the third exemplary embodiment. That is, the print jobs are the same as those indicated in FIG. 19. The length of one roll of rolled paper and the maximum transport speed of the image forming apparatus 10 (see FIG. 1) are also the same as those according to the third exemplary embodiment.

In the present exemplary embodiment, as illustrated in FIG. 22, one print job is selected in the descending order of the print speed, and added to the print list corresponding to the rolled paper.

Therefore, the print jobs #23, #25, and #24 are allocated to the rolled paper #21, and the print jobs #21, #22, and #26 are allocated to the rolled paper #22.

For example, in the case of the rolled paper #21, the print speed of the print job #24, among the allocated print jobs, is the lowest. Therefore, the print speed for the rolled paper #21 is determined as 80 meters/minute. A speed of 80 meters/minute is the same as the maximum transport speed of the image forming apparatus 10 (see FIG. 1).

In this case, it takes 1 hour 46 minutes 15 seconds to print the print jobs #23, #25, and #24 allocated to the rolled paper #21.

In the case of the rolled paper #22, meanwhile, the print speed of the print job #26, among the allocated print jobs, is the lowest. Therefore, the print speed for the rolled paper #22 is determined as 40 meters/minute. In this case, it takes 4 hours and 10 minutes to print the print jobs #21, #22, and #26 allocated to the rolled paper #22.

Therefore, it takes 5 hours 56 minutes 15 seconds to print the print jobs #21 to #26, excluding the paper replacement time.

Other Exemplary Embodiments

While exemplary embodiments of the present disclosure have been described above, the technical scope of the present disclosure is not limited to the exemplary embodiments discussed earlier. It is apparent from the following claims that a variety of modifications and improvements that may be made to the exemplary embodiments discussed earlier also fall within the technical scope of the present disclosure.

In the exemplary embodiments discussed earlier, the management server 30 (see FIG. 1) executes the determination of allocation of the print jobs to the rolled paper and the update of an estimation of the time needed to execute printing according to the combination of the allocated print jobs. However, such functions may be executed by the image forming apparatus 10 alone, or the management server 30 and the image forming apparatus 10 may cooperate with each other to execute the determination of allocation of the print jobs to the rolled paper and the update of an estimation of the time needed to execute printing according to the combination of the allocated print jobs.

In the exemplary embodiments discussed earlier, the management server 30 is connected to the image forming apparatus 10 through a network, which is not limited to a local area network (LAN) and may be the Internet, a dedicated line, or a signal line.

In the exemplary embodiments discussed earlier, the print speed and the job execution time of each print job are updated in accordance with variations in the combination of the print jobs allocated to the rolled paper, and information after the update is reflected in the content of display on the display device 34 (see FIG. 1). However, display of information after the update is not necessary.

In the embodiments above, the term "processor 31" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor 31" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a processor configured to add print jobs to be allocated to one roll of rolled paper, one print job at a time, in a range in which a remaining amount of the rolled paper is not exceeded; dynamically change an estimation of a time needed to execute each print job previously added for the one roll of rolled paper to reflect print parameters changed because of the added print jobs; and in a case where there are a plurality of candidates for an added print job, each including a transport speed that is higher than a transport speed determined for the combination of print jobs that have been allocated, determine to add one of the plurality of candidates with a transport speed that is the lowest of the plurality of candidates.

2. The information processing system according to claim 1, wherein the processor is configured to:
in a case where there are a plurality of candidates for an added print job, each including a transport speed that is lower than a transport speed determined for the combination of print jobs that have been allocated, determine to add, one of the plurality of candidates with a transport speed that is the highest of the plurality of candidates.

3. The information processing system according to claim 1, wherein the processor is configured to: select a print job that uses a longest length of paper, among unallocated print jobs, as a first print job to be allocated to the rolled paper.

4. The information processing system according to claim 2, wherein the processor is configured to:
select a print job that uses a longest length of paper, among unallocated print jobs, as a first print job to be allocated to the rolled paper.

5. The information processing system according to claim 1, wherein the processor is configured to:
add print jobs to be allocated to the rolled paper, one print job at a time, in a descending order of speed needed to process the print jobs in the range in which the remaining amount of the rolled paper is not exceeded.

6. The information processing system according to claim 1, wherein the processor is configured to:
dynamically change the estimation of the time needed to execute each print job at a time when the print jobs allocated to the rolled paper is determined.

7. A non-transitory computer readable medium storing a program causing a computer to execute a process comprising: adding print jobs to be allocated to one roll of rolled paper, one print job at a time, in a range in which a remaining amount of the rolled paper is not exceeded; dynamically changing an estimation of a time needed to execute each print job previously added for the one roll of rolled paper to reflect print parameters changed because of the added print jobs; and in a case where there are a plurality of candidates for an added print job, each including a transport speed that is higher than a transport speed determined for the combination of print jobs that have been allocated, adding one of the plurality of candidates with a transport speed that is the lowest of the plurality of candidates.

8. An image forming system comprising: an image forming apparatus that forms an image on rolled paper; and an information processing system comprising means for adding print jobs to be allocated to one roll of rolled paper, one print job at a time, in a range in which a remaining amount of the rolled paper is not exceeded; means for dynamically changing an estimation of a time needed to execute each print job previously added for the one roll of rolled paper to reflect print parameters changed because of the added print jobs; and means for adding, in a case where there are a plurality of candidates for an added print job, each including a transport speed that is higher than a transport speed determined for the combination of print jobs that have been allocated, one of the plurality of candidates with a transport speed that is the lowest of the plurality of candidates.

* * * * *